United States Patent
Li et al.

(10) Patent No.: US 11,956,456 B2
(45) Date of Patent: Apr. 9, 2024

(54) SELECTIVE UPDATING OF HMVP TABLE BASED ON CODED INTER CODED BLOCK

(71) Applicant: TENCENT AMERICA LLC, Palo Alto, CA (US)

(72) Inventors: Guichun Li, San Jose, CA (US); Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/342,324

(22) Filed: Jun. 27, 2023

(65) Prior Publication Data

US 2023/0345027 A1    Oct. 26, 2023

Related U.S. Application Data

(63) Continuation of application No. 17/832,298, filed on Jun. 3, 2022, now Pat. No. 11,750,828, which is a
(Continued)

(51) Int. Cl.
*H04N 7/12* (2006.01)
*H04N 19/105* (2014.01)
(Continued)

(52) U.S. Cl.
CPC .......... *H04N 19/44* (2014.11); *H04N 19/105* (2014.11); *H04N 19/159* (2014.11);
(Continued)

(58) Field of Classification Search
CPC .................................................. H04N 19/423
See application file for complete search history.

(56) References Cited

U.S. PATENT DOCUMENTS

2017/0332099 A1    11/2017 Lee et al.

FOREIGN PATENT DOCUMENTS

| EP | 3763123 A1 | 1/2021 |
| EP | 3857888 A1 | 8/2021 |

OTHER PUBLICATIONS

Chen et al., "CE4.3.1: Shared merging candidate list," Joint Video Experts Team (JVET) of ITU-T SG 16 WP 3 and ISO/IEC JTC 1/SC 29/WG 11, Jan. 9-18, 2019, JVET-M0170-v1, 13th Meeting: Marrakech, MA, 13 pages.
(Continued)

*Primary Examiner* — Y Lee
*Assistant Examiner* — Young Lee
(74) *Attorney, Agent, or Firm* — ARENTFOX SCHIFF LLP

(57) ABSTRACT

A method of video encoding includes receiving a merge sharing region including a plurality of coding blocks, constructing a shared merge candidate list for the merge sharing region, and encoding a current inter coded coding block in the merge sharing region based on the shared merge candidate list. The method also includes determining whether to update a history-based motion vector prediction (HMVP) table with motion information of the current inter coded coding block based on whether the current inter coded coding block is inter coded with a merge/skip mode. The method further includes updating the HMVP table with the motion information of the current inter coded coding block when the HMVP table is determined to be updated with the motion information of the current inter coded coding block.

20 Claims, 17 Drawing Sheets

Related U.S. Application Data continuation of application No. 17/306,577, filed on May 3, 2021, now Pat. No. 11,381,832, which is a continuation of application No. 16/744,938, filed on Jan. 16, 2020, now Pat. No. 11,032,560.

(60) Provisional application No. 62/793,872, filed on Jan. 17, 2019.

(51) Int. Cl.
*H04N 19/159* (2014.01)
*H04N 19/176* (2014.01)
*H04N 19/189* (2014.01)
*H04N 19/423* (2014.01)
*H04N 19/44* (2014.01)

(52) U.S. Cl.
CPC ......... *H04N 19/176* (2014.11); *H04N 19/189* (2014.11); *H04N 19/423* (2014.11)

(56) References Cited

OTHER PUBLICATIONS

Extended European Search Report in EP20741701.5, dated Oct. 5, 2022, 9 pages.

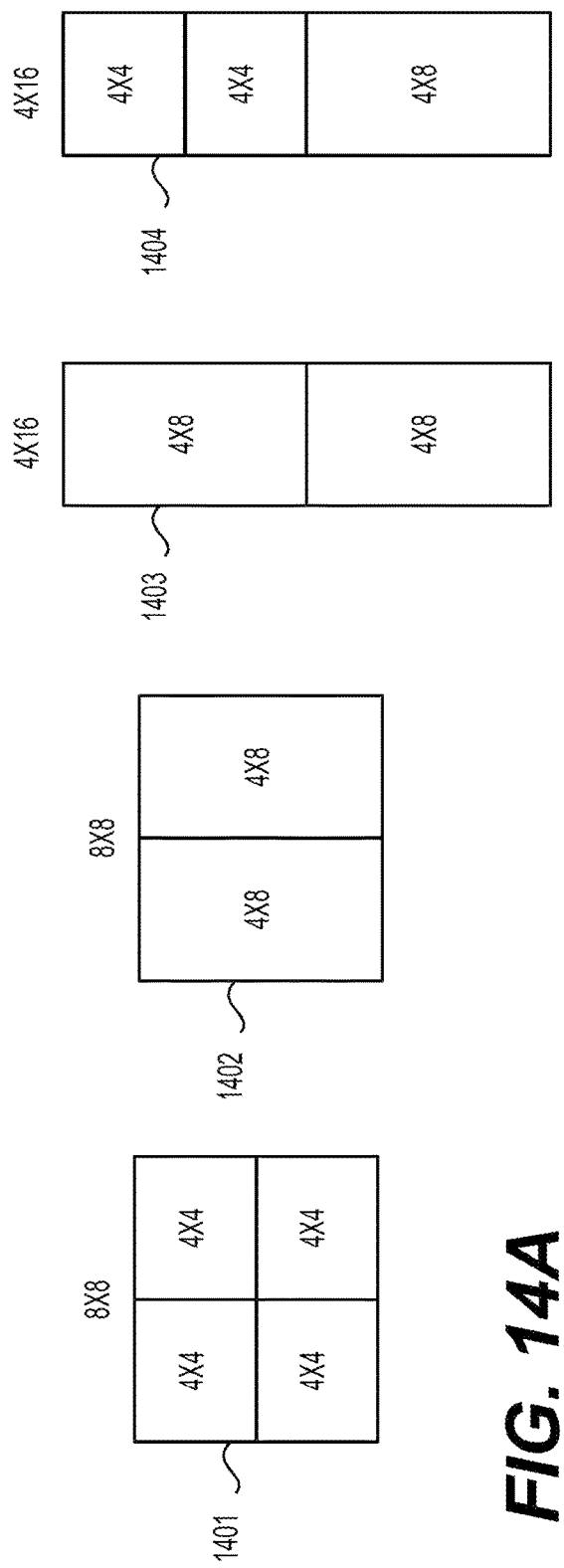
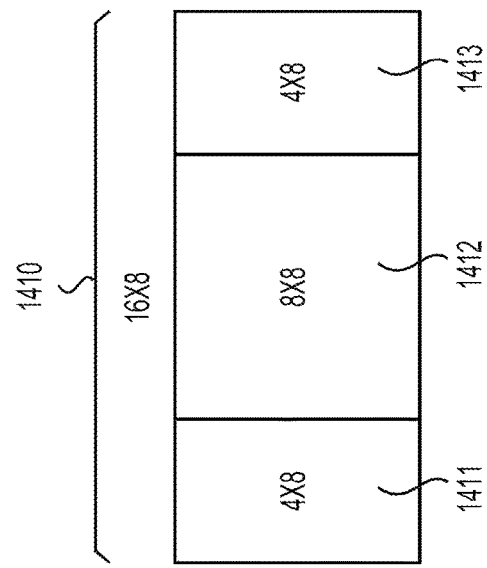
FIG. 14A
FIG. 14B

SELECTIVE UPDATING OF HMVP TABLE BASED ON CODED INTER CODED BLOCK

INCORPORATION BY REFERENCE

This application is a continuation of U.S. application Ser. No. 17/832,298, "INTER PREDICTION CODING WITHIN A MERGE SHARING REGION" filed on Jun. 3, 2022, which is a continuation of U.S. application Ser. No. 17/306,577, "METHOD AND APPARATUS FOR VIDEO CODING" filed on May 3, 2021, now U.S. Pat. No. 11,381,832, which is a continuation of U.S. application Ser. No. 16/744,938, "METHOD AND APPARATUS FOR VIDEO CODING WITHOUT UPDATING THE HMVP TABLE" filed on Jan. 16, 2020, now U.S. Pat. No. 11,032,560, which is based upon and claims the benefit of priority to U.S. Provisional Application No. 62/793,872, "METHOD OF HMVP BUFFER UPDATE WHEN SHARED MERGE LIST IS USED" filed on Jan. 17, 2019. The above-listed applications are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 ((102) through (106), respectively). In H.265, the MV prediction can use predictors from the same reference picture that the neighboring block is using.

SUMMARY

Aspects of the disclosure provide a method for video decoding at a video decoder. A merge sharing region including a plurality of coding blocks can be received. A shared merge candidate list is constructed for the merge sharing region. The merge sharing region is decoded based on the shared merge candidate list. At least one inter coded coding block within the merge sharing region is processed without updating a history-based motion vector prediction (HMVP) table with motion information of the at least one inter coded coding block.

In an example, all inter coded blocks in the merge sharing region are processed without updating the HMVP table with motion information of any of the inter coded blocks. In an example, the coding block(s) within the merge sharing region that is inter coded with a merge mode or a skip mode is processed without updating the HMVP table with motion information of the coding block(s). In an example, the coding block(s) within the merge sharing region that is inter coded (i) using a merge candidate on the shared merge candidate list as motion information of the coding block(s), or (ii) using motion information determined based on a merge candidate on the shared merge candidate list is processed without updating the HMVP table with motion information of the coding block(s). In an embodiment, the coding block(s) within the merge sharing region that is coded based on the shared merge candidate list is processed without updating the HMVP table with motion information of the coding block(s).

In an example, the coding block(s) within the merge sharing region that is inter coded using a merge candidate on the shared merge candidate list as motion information of the coding block(s) is processed without updating the HMVP table with motion information of the coding block(s).

In an example, motion information of the first inter coded coding block within the merge sharing region according to a decoding order is used to update the HMVP table, and the other inter coded coding block(s) within the merge sharing region is processed without updating the HMVP table with motion information of the other inter coded coding block(s). In an example, motion information of the last inter coded coding block within the merge sharing region according to a decoding order is used to update the HMVP buffer, and the other inter coded coding block(s) within the merge sharing region is processed without updating the HMVP buffer with motion information of the other inter coded coding block(s).

Aspects of the disclosure provide an apparatus of video decoding. The apparatus can include circuitry configured to receive a merge sharing region including a plurality of coding blocks. The circuitry can further be configured to construct a shared merge candidate list for the merge sharing region, and decode the merge sharing region based on the shared merge candidate list. At least one inter coded coding block within the merge sharing region is processed without updating an HMVP table with motion information of the at least one inter coded coding block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIGS. 14A-14B show examples of merge sharing regions in accordance with an embodiment.

DETAILED DESCRIPTION OF EMBODIMENTS

I. Video Coding Encoder and Decoder

Figure 1:
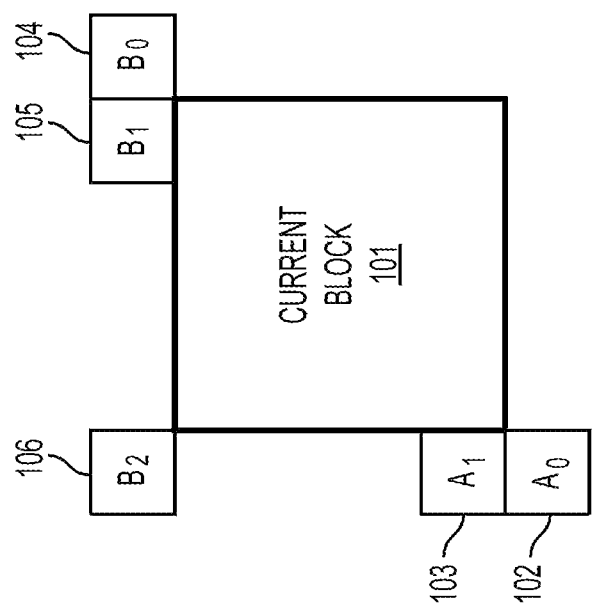
FIG. 1 is a schematic illustration of a current block and its surrounding spatial merge candidates in one example.
Figure 2:
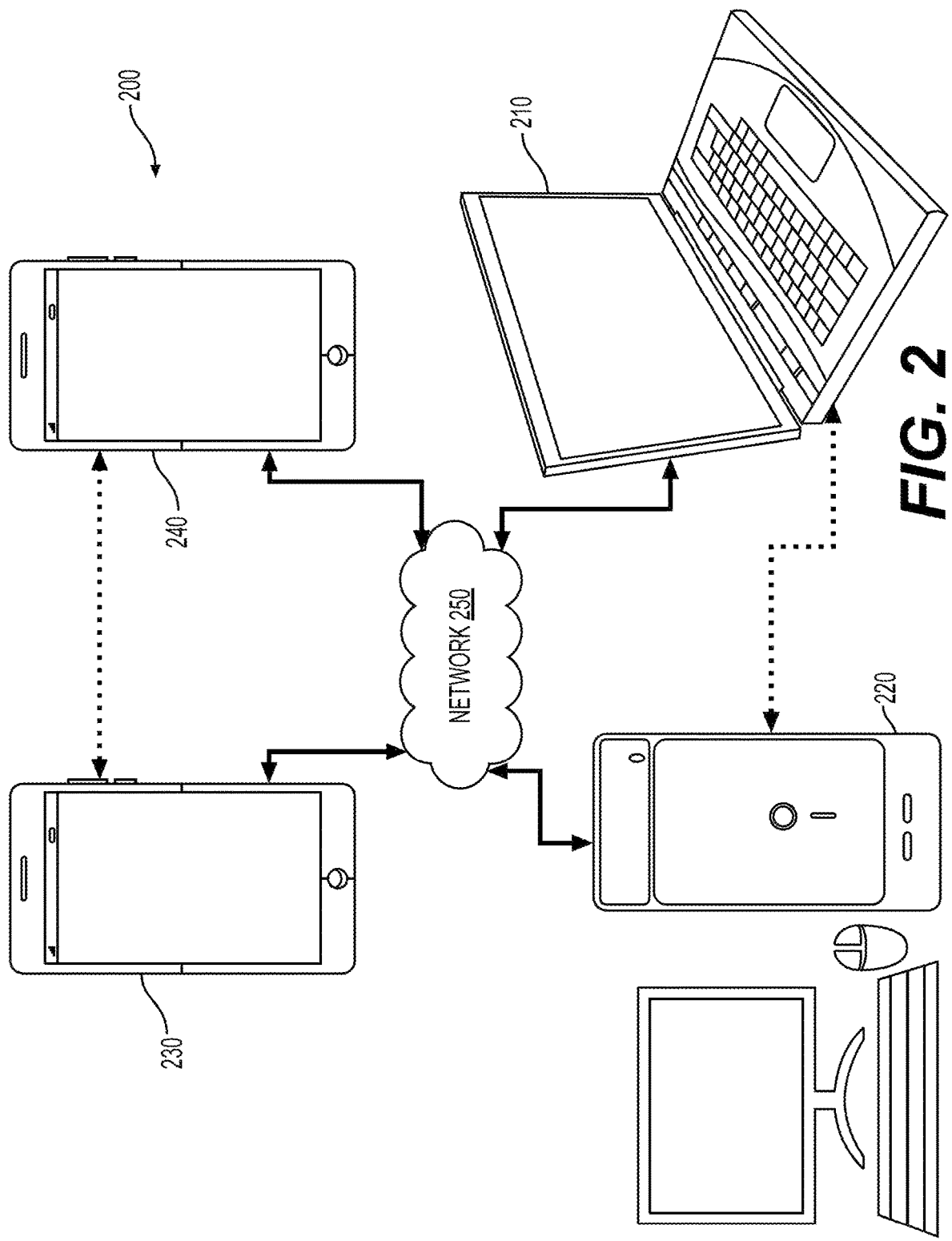
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
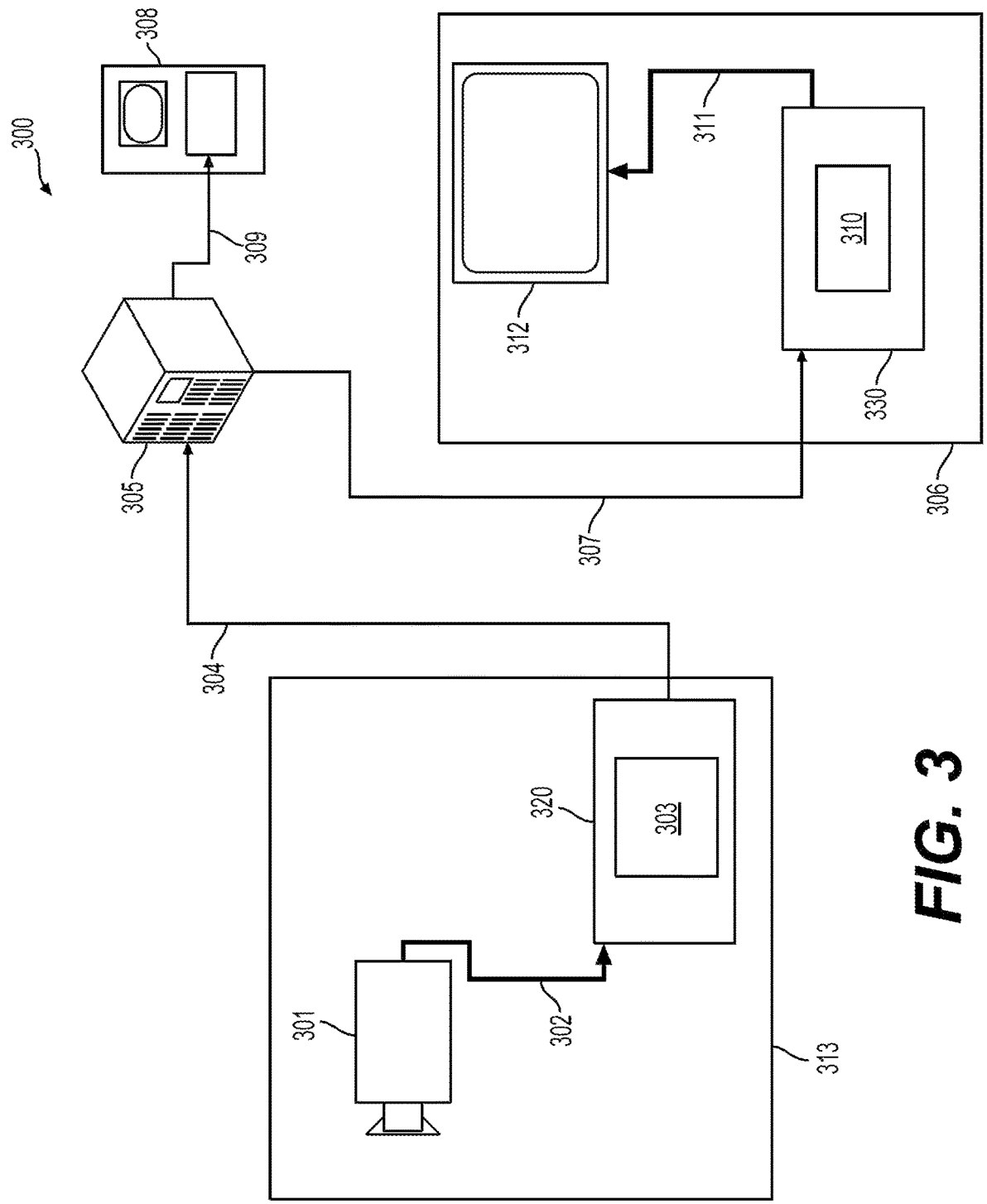
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
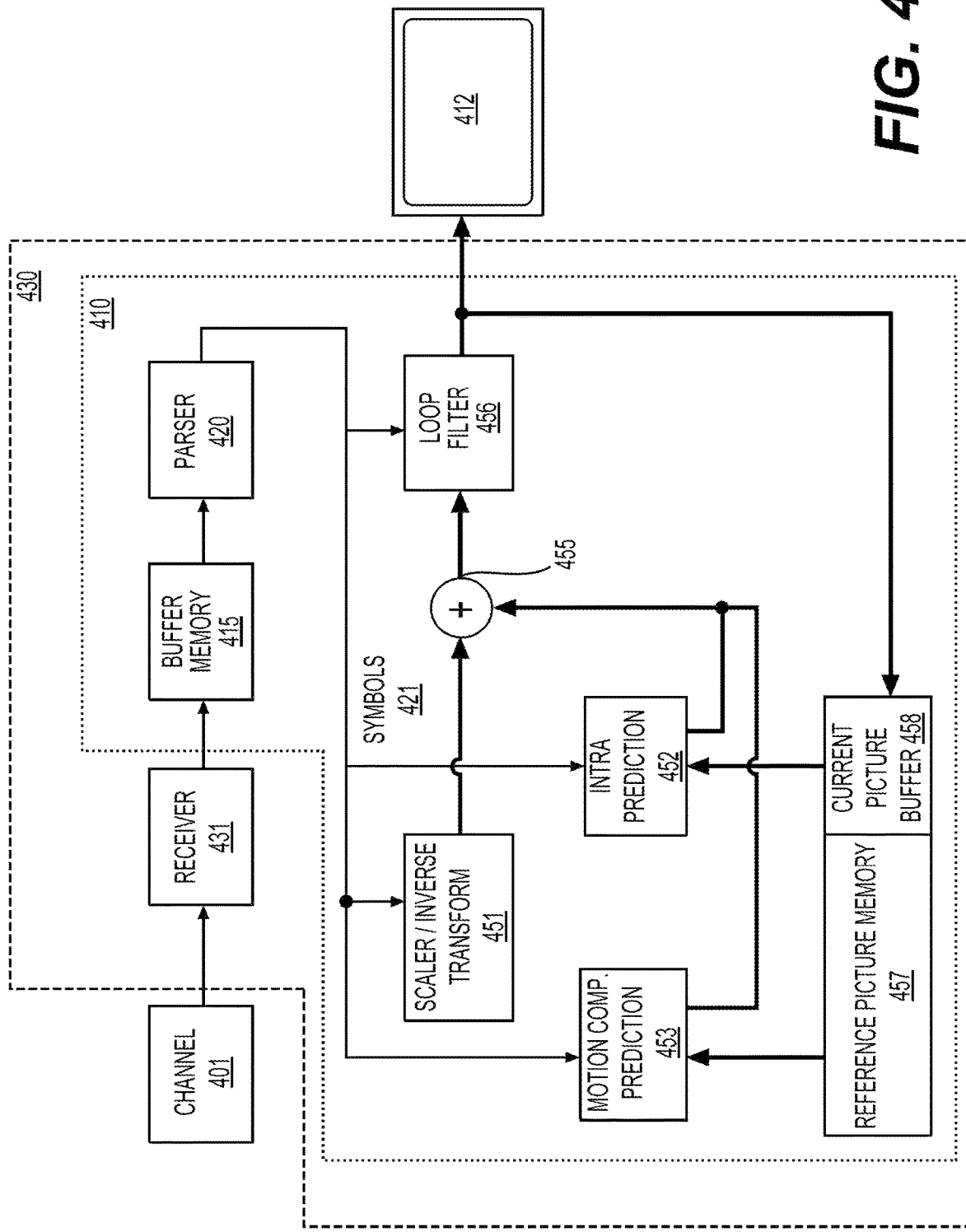
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
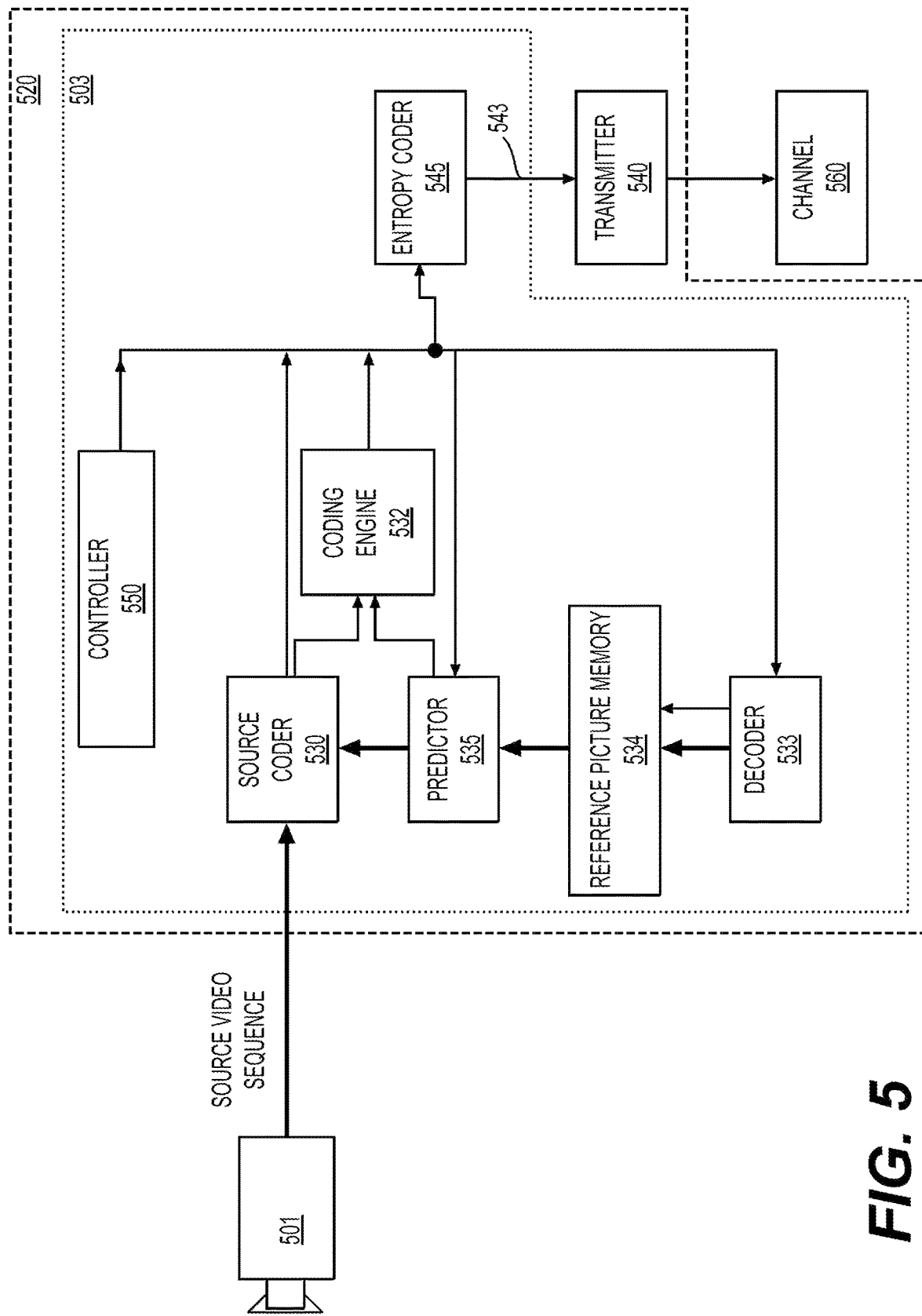
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
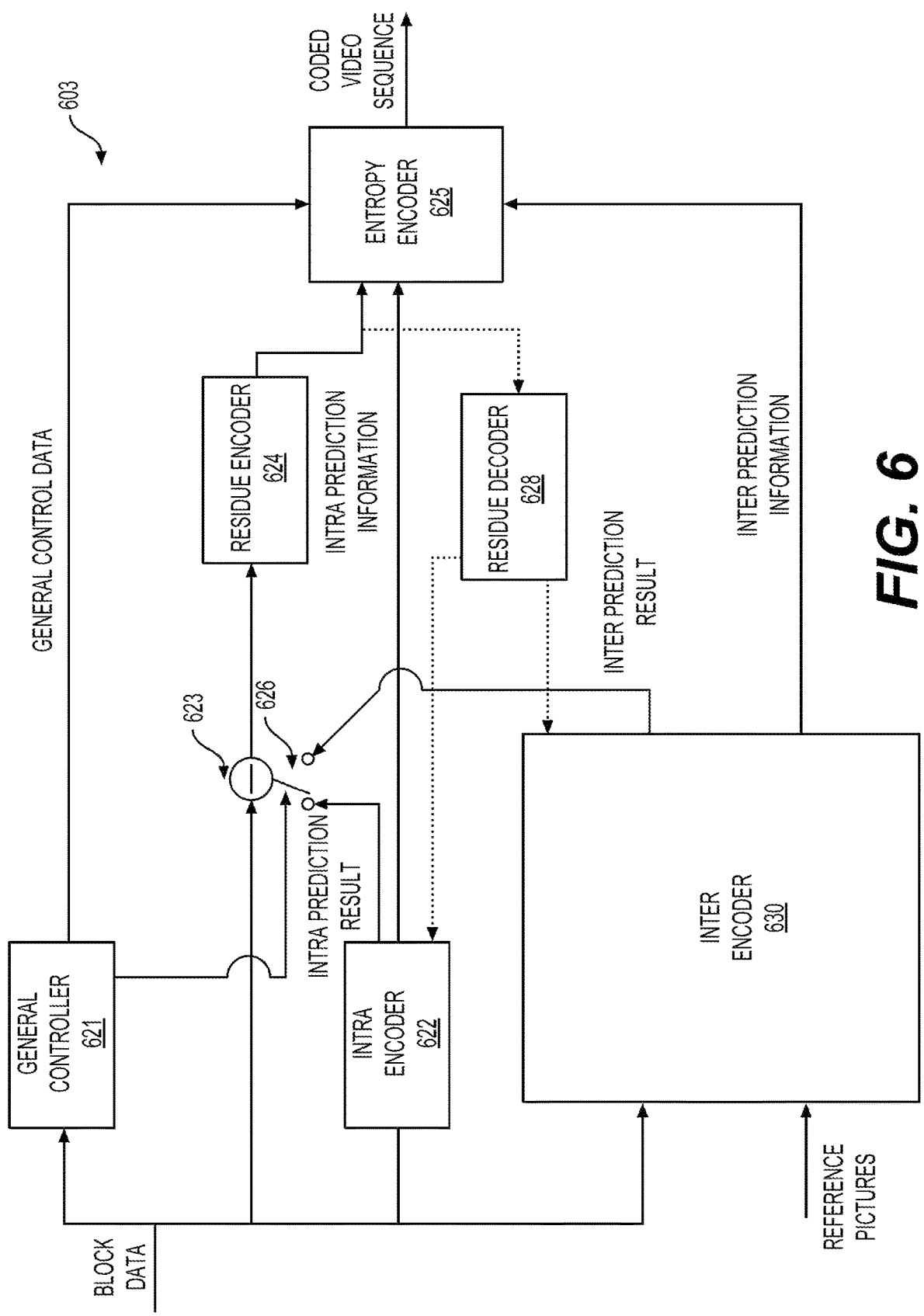
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
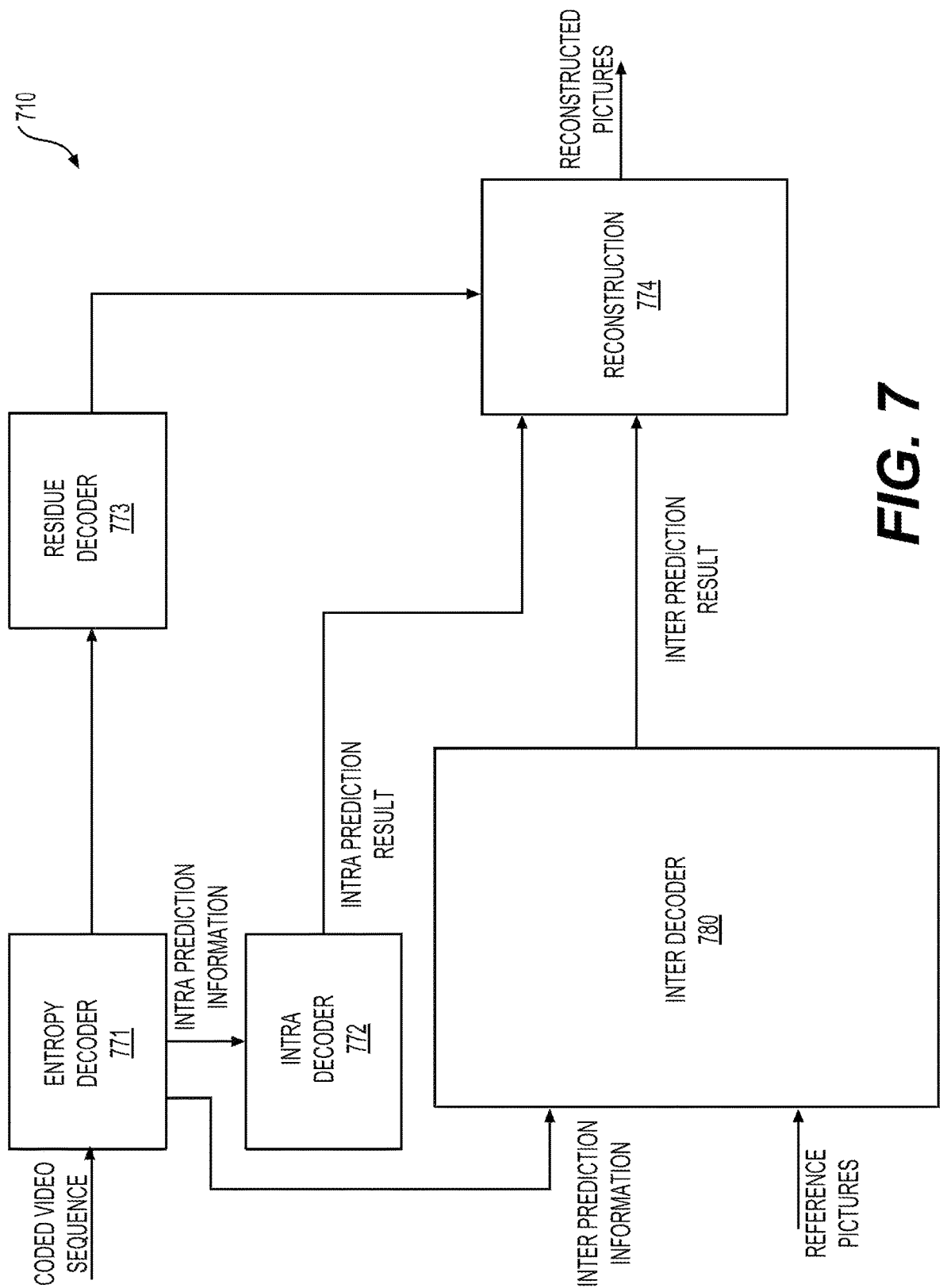
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Picture Prediction Modes

In various embodiments, a picture can be partitioned into blocks, for example, using a tree structure based partition scheme. The resulting blocks can then be processed with different processing modes, such as an intra prediction mode, an inter prediction mode (e.g., merge mode, skip mode, advanced motion vector prediction (AVMP) mode), and the like. An intra coded block can be a block that is coded with an intra prediction mode. In contrast, an inter coded block can be a bock that is processed with an inter prediction mode.

Examples of inter prediction modes can be classified into two categories: (i) AMVP mode, and (ii) merge/skip mode. Examples of the merge/skip mode can include HEVC merge mode (or regular merge mode), current reference picture (CRP) mode (or intra block copy (IBC)) mode, triangle partition mode, subblock-based temporal motion vector prediction (sbTMVP) mode, merge with motion vector difference (MMVD) mode, and affine merge mode. In some embodiments, the AMVP mode and the merge/skip mode can be combined with a history-based motion vector prediction (HMVP) table to encoding or decoding a coding block.

Examples of inter prediction modes and employment of HMVP tables are described below.

1. Regular Merge Mode

When a currently processed block, referred to as a current block, is processed with a merge mode, a neighboring block can be selected from a spatial or temporal neighborhood of the current block. The current block can be merged with the selected neighboring block by sharing a same set of motion data (or referred to as motion information) from the selected neighboring block. This merge mode operation can be performed over a group of neighboring blocks, such that a region of neighboring blocks can be merged together and share a same set of motion data. During transmission from an encoder to a decoder, an index indicating the motion data of the selected neighboring block can be transmitted for the current block, instead of transmission of the whole set of motion data. In this way, an amount of data (bits) that are used for transmission of motion information can be reduced, and coding efficiency can be improved.

In the above example, the neighboring block, which provides the motion data, can be selected from a set of candidate positions. The candidate positions can be pre-defined with respect to the current block. For example, the candidate positions can include spatial candidate positions and temporal candidate positions. Each spatial candidate position is associated with a spatial neighboring block neighboring the current block. Each temporal candidate position is associated with a temporal neighboring block located in another coded picture (e.g., a previously coded picture). Neighboring blocks overlapping the candidate positions (referred to as candidate blocks) are a subset of all the spatial or temporal neighboring blocks of the current block. In this way, the candidate blocks can be evaluated for selection of a to-be-merged block instead of the whole set of neighboring blocks.

Figure 8:
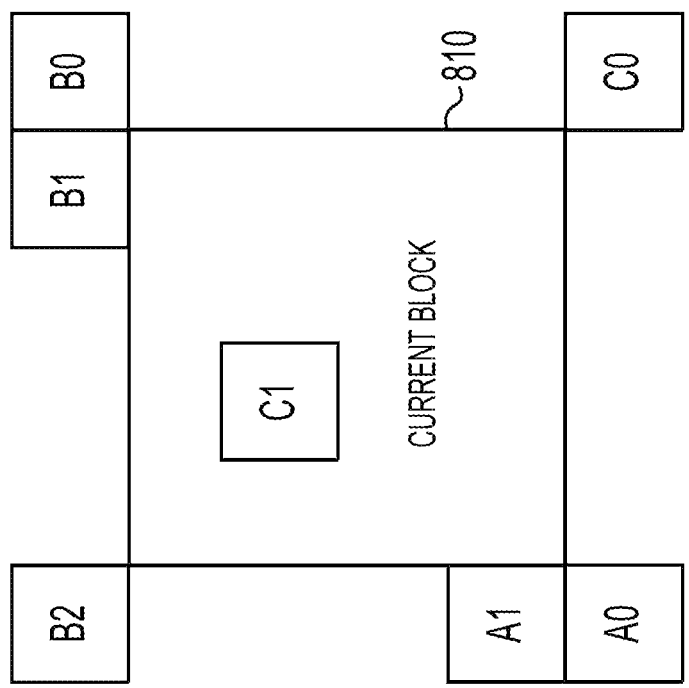
FIG. 8 is a schematic illustration of merge candidate positions of a merge mode in accordance with an embodiment.

FIG. 8 shows an example of candidate positions. From those candidate positions, a set of merge candidates can be selected to construct a merge candidate list. As shown, a current block (810) is to be processed with merge mode. A set of candidate positions {A1, B1, B0, A0, B2, C0, C1} are defined for the merge mode processing. Specifically, candidate positions {A1, B1, B0, A0, B2} are spatial candidate positions that represent positions of candidate blocks that are in the same picture as the current block (810). In contrast, candidate positions {C0, C1} are temporal candidate positions that represent positions of candidate blocks that are in another coded picture and neighbor or overlap a co-located block of the current block (810). As shown, the candidate position C1 can be located near (e.g., adjacent to) a center of the current block (810).

A candidate position can be represented by a block of samples or a sample in different examples. In FIG. 8, each candidate position is represented by a block of samples, for example, having a size of 4×4 samples. A size of such a block of samples corresponding to a candidate position can be equal to or smaller than a minimum allowable size of PBs (e.g., 4×4 samples) defined for a tree-based partitioning scheme used for generating the current block (810). Under such a configuration, a block corresponding to a candidate position can always be covered within a single neighboring PB. In an alternative example, a sample position (e.g., a bottom-right sample within the block A1, or a top-right sample within the block A0) may be used to represent a candidate position. Such a sample is referred to as a representative sample, while such a position is referred to as a representative position.

In one example, based on the candidate positions {A1, B1, B0, A0, B2, C0, C1} defined in FIG. 8, a merge mode process can be performed to select merge candidates from the candidate positions {A1, B1, B0, A0, B2, C0, C1} to construct a candidate list. The candidate list can have a predefined maximum number of merge candidates, represented as Cm. Each merge candidate in the candidate list can include a set of motion data that can be used for motion-compensated prediction.

The merge candidates can be listed in the candidate list according to a certain order. For example, depending on how the merge candidate is derived, different merge candidates may have different probabilities of being selected. The merge candidates having higher probabilities of being selected are positioned in front of the merge candidates having lower probabilities of being selected. Based on such an order, each merge candidate is associated with an index (referred to as a merge index). In one embodiment, a merge candidate having a higher probability of being selected will have a smaller index value such that fewer bits are needed for coding the respective index.

In one example, the motion data of a merge candidate can include horizontal and vertical motion vector displacement values of one or two motion vectors, one or two reference picture indices associated with the one or two motion vectors, and optionally an identification of which reference picture list is associated with an reference picture index.

In an example, according to a predefined order, a first number of merge candidates, Ca, is derived from the spatial candidate positions according to the order {A1, B1, B0, A0, B2}, and a second number of merge candidates, Cb=Cm−Ca, is derived from the temporal candidate positions according to the order {C0, C1}. The numerals A1, B1, B0, A0, B2, C0, C1 for representing candidate positions can also be used to refer to merge candidates. For example, a merge candidate obtained from candidate position A1 is referred to as the merge candidate A1.

In some scenarios, a merge candidate at a candidate position may be unavailable. For example, a candidate block at a candidate position can be intra-predicted, outside of a slice or tile including the current block (810), or not in a same coding tree block (CTB) row as the current block (810). In some scenarios, a merge candidate at a candidate position may be redundant. For example, one neighboring block of the current block (810) can overlap two candidate positions. The redundant merge candidate can be removed from the candidate list (e.g., by performing a pruning process). When a total number of available merge candidates (with redundant candidates being removed) in the candidate list is smaller than the maximum number of merge candidates Cm, additional merge candidates can be generated (e.g., according to a preconfigured rule) to fill the candidate list such that the candidate list can be maintained to have a fixed length. For example, additional merge candidates can include combined bi-predictive candidates and zero motion vector candidates.

After the candidate list is constructed, at an encoder, an evaluation process can be performed to select a merge candidate from the candidate list. For example, rate-distortion (RD) performance corresponding to each merge candidate can be calculated, and the one with the best RD performance can be selected. Accordingly, a merge index associated with the selected merge candidate can be determined for the current block (810) and signaled to a decoder.

At a decoder, the merge index of the current block (810) can be received. A similar candidate list construction process, as described above, can be performed to generate a candidate list that is the same as the candidate list generated at the encoder side. After the candidate list is constructed, a merge candidate can be selected from the candidate list based on the received merge index without performing any further evaluations in some examples. Motion data of the selected merge candidate can be used for a subsequent motion-compensated prediction of the current block (810).

A skip mode is also introduced in some examples. For example, in the skip mode, a current block can be predicted using a merge mode as described above to determine a set of motion data, however, no residue is generated, and no transform coefficients are transmitted. A skip flag can be associated with the current block. The skip flag and a merge index indicating the related motion information of the current block can be signaled to a video decoder. For example, at the beginning of a CU in an inter-picture prediction slice, a skip flag can be signaled that implies the following: the CU only contains one PU (2N×2N); the merge mode is used to derive the motion data; and no residual data is present in the bitstream. At the decoder side, based on the skip flag, a prediction block can be determined based on the merge index for decoding a respective current block without adding residue information. Thus, various methods for video coding with merge mode disclosed herein can be utilized in combination with a skip mode.

As an example, in an embodiment, when a merge flag or a skip flag is signaled as true in a bitstream, a merge index is then signaled to indicate which candidate in a merge candidate list will be used to provide motion vectors for a current block. Up to four spatially neighboring motion vectors and up to one temporally neighboring motion vectors can be added to the merge candidate list. A syntax MaxMergeCandsNum is defined as the size of the merge candidate list. The syntax MaxMergeVandsNum can be signaled in the bitstream.

2. Affine Merge Mode

Figure 9:
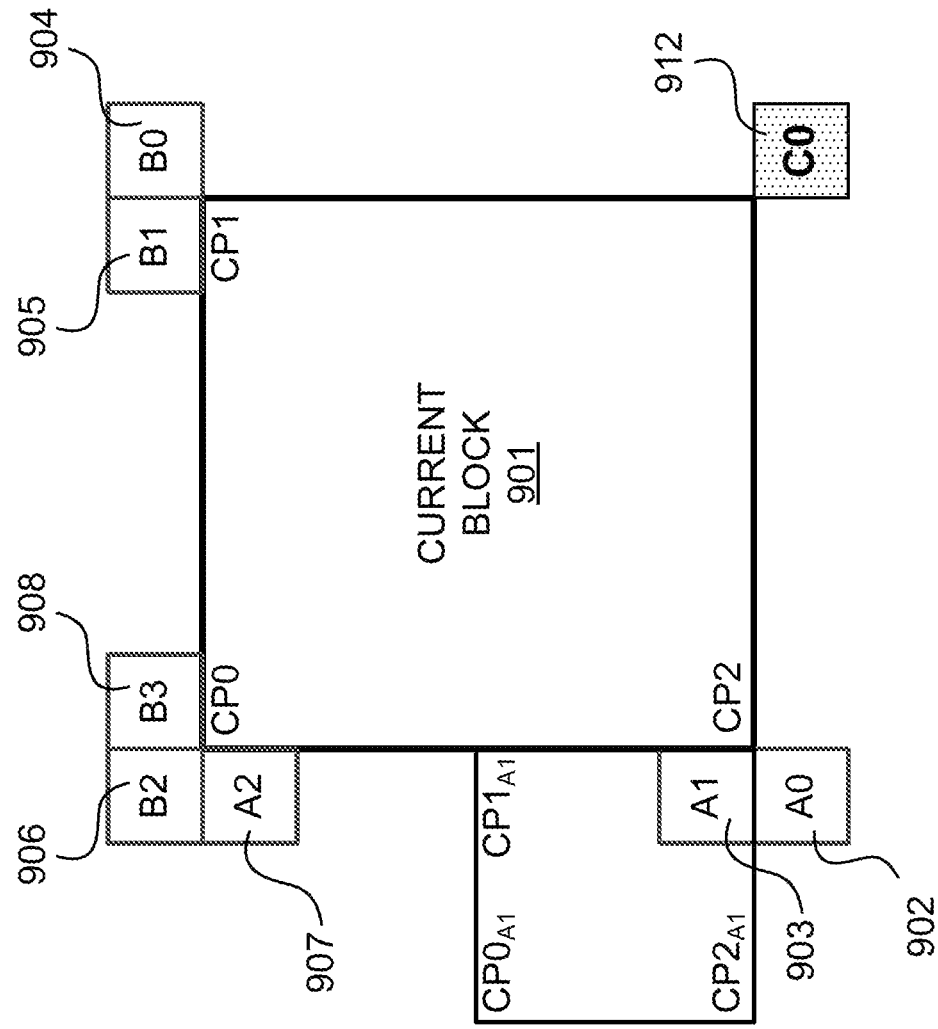
FIG. 9 is a schematic illustration of spatial neighboring blocks and temporal neighboring blocks for a current block in accordance with an embodiment.

FIG. 9 is a schematic illustration of spatial neighboring blocks and a temporal neighboring block of a current block (or referred to as a coding unit (CU)) (901) in accordance with an embodiment. As shown, the spatial neighboring blocks are denoted A0, A1, A2, B0, B1, B2, and B3 (902, 903, 907, 904, 905, 906, and 908, respectively), and the temporal neighboring block are denoted C0 (912). In some examples, the spatial neighboring blocks A0, A1, A2, B0, B1, B2, and B3 and the current block (901) belong to a same picture. In some examples, the temporal neighboring block C0 belongs to a reference picture and corresponds to a position outside the current block (901) and adjacent to a lower-right corner of the current block (901).

In some examples, a motion vector of the current block (901) and/or sub-blocks of the current block can be derived using an affine model (e.g., a 6-parameter affine model or a 4-parameter affine model). In some examples, an affine model has 6 parameters (e.g., a 6-parameter affine model) to describe the motion vector of a block. In an example, the 6 parameters of an affine coded block can be represented by three motion vectors (also referred to as three control point motion vectors (CPMVs)) at three different locations of the block (e.g., control points CP0, CP1, and CP2 at upper-left, upper-right, and lower-left corners in FIG. 9). In another example, a simplified affine model uses four parameters to describe the motion information of an affine coded block, which can be represented by two motion vectors (also referred to as two CPMVs) at two different locations of the block (e.g., control points CP0 and CP1 at upper-left and upper-right corners in FIG. 9).

A list of motion information candidates (also referred to as an affine merge candidate list) can be constructed using an affine merge mode based on motion information of one or more of the spatial neighboring blocks and/or temporal neighboring blocks. In some examples, the affine merge mode can be applied when the current block (901) has a width and height that are equal to or greater than 8 samples. According to the affine merge mode, the CPMVs of the current block (901) can be determined based on the motion information candidates on the list. In some examples, the list of motion information candidates can include up to five CPMV candidates, and an index can be signaled to indicate which CPMV candidate is to be used for the current block.

In some embodiments, the affine merge candidate list can have three types of CPVM candidates, including inherited affine candidates, constructed affine candidates, and a zero MV. An inherited affine candidate can be derived by extrapolation from the CPMVs of the neighboring blocks. A constructed affine candidate can be derived using the translational MVs of the neighboring blocks.

In an example, there can be at most two inherited affine candidates, which are derived from corresponding affine motion models of the neighboring blocks, including one block from left neighboring blocks (A0 and A1) and one from upper neighboring blocks (B0, B1, and B2). For the candidate from the left, neighboring blocks A0 and A1 can be sequentially checked, and a first available inherited affine candidate from neighboring blocks A0 and A1 is used as the inherited affine candidate from the left. For the candidate from the top, neighboring blocks B0, B1, and B2 can be sequentially checked, and a first available inherited affine candidate from neighboring blocks B0, B1, and B2 is used as the inherited affine candidate from the top. In some examples, no pruning check is performed between the two inherited affine candidates.

When a neighboring affine block is identified, a corresponding inherited affine candidate to be added to the affine merge list of the current block (901) can be derived from the control point motion vectors of the neighboring affine block. In the FIG. 9 example, if the neighboring block A1 is coded in affine mode, the motion vectors of the upper-left corner (control point $CP0_{A1}$), the upper-right corner (control point $CP1_{A1}$), and the lower-left corner (control point $CP2_{A1}$) of block A1 can be obtained. When block A1 is coded using a 4-parameter affine model, the two CPMVs as an inherited affine candidate of the current block (901) can be calculated according to the motion vectors of control point $CP0_{A1}$ and control point $CP1_{A1}$. When block A1 is coded using a 6-parameter affine model, the three CPMVs as an inherited affine candidate of the current block (901) can be calculated according to the motion vectors of control point $CP0_{A1}$, control point $CP1_{A1}$, and control point $CP2_{A1}$.

Moreover, a constructed affine candidate can be derived by combining the neighboring translational motion information of each control point. The motion information for the control points CP0, CP1, and CP2 is derived from the specified spatial neighboring blocks A0, A1, A2, B0, B1, B2, and B3.

For example, $CPMV_k$ (k=1, 2, 3, 4) represents the motion vector of the k-th control point, where $CPMV_1$ corresponds to control point CP0, $CPMV_2$ corresponds to control point CP1, $CPMV_3$ corresponds to control point CP2, and $CPMV_4$ corresponds to a temporal control point based on temporal neighboring block C0. For $CPMV_1$, neighboring blocks B2, B3, and A2 can be sequentially checked, and a first available motion vector from neighboring blocks B2, B3, and A2 is used as $CPMV_1$. For $CPMV_2$, neighboring blocks B1 and B0 can be sequentially checked, and a first available motion vector from neighboring blocks B1 and B0 is used as $CPMV_2$. For $CPMV_3$, neighboring blocks A1 and A0 can be sequentially checked, and a first available motion vector from neighboring blocks A1 and A0 is used as $CPMV_3$. Moreover, the motion vector of temporal neighboring block C0 can be used as $CPMV_4$, if available.

After $CPMV_1$, $CPMV_2$, $CPMV_3$, and $CPMV_4$, of four control points CP0, CP1, CP2 and the temporal control point are obtained, an affine merge candidate list can be constructed to include affine merge candidates that are constructed in an order of: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$. Any combination of three CPMVs can form a 6-parameter affine merge candidate, and any combination of two CPMVs can form a 4-parameter affine merge candidate. In some examples, in order to avoid a motion scaling process, if the reference indices of a group of control points are different, the corresponding combination of CPMVs can be discarded.

3. Subblock-Based Temporal Motion Vector Prediction (SbTMVP) Mode

Figure 10A:
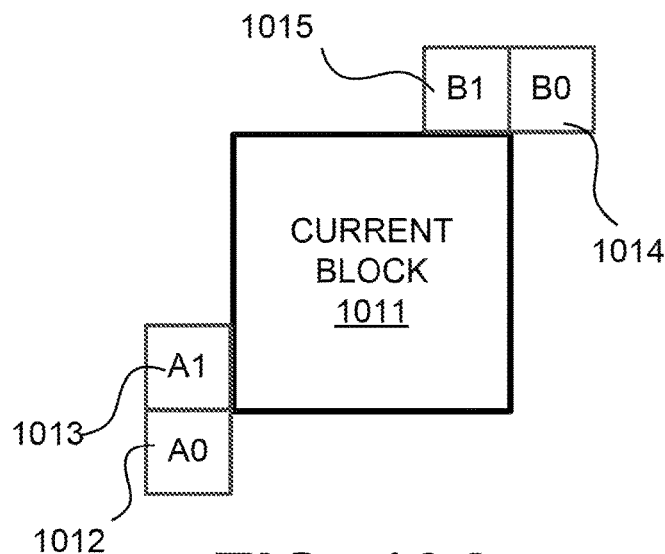
FIG. 10A is a schematic illustration of spatial neighboring blocks that can be used to determine predicting motion information for a current block using a sub-block based temporal motion vector prediction method based on motion information of the spatial neighboring blocks in accordance with one embodiment.

FIG. 10A is a schematic illustration of spatial neighboring blocks that can be used to determine predicting motion information for a current block (1011) using a sub-block based temporal MV prediction (SbTMVP) method based on motion information of the spatial neighboring blocks in accordance with one embodiment. FIG. 10A shows a current block (1011) and its spatial neighboring blocks denoted A0, A1, B0, and B1 (1012, 1013, 1014, and 1015, respectively). In some examples, spatial neighboring blocks A0, A1, B0, and B1 and the current block (1011) belong to a same picture.

Figure 10B:
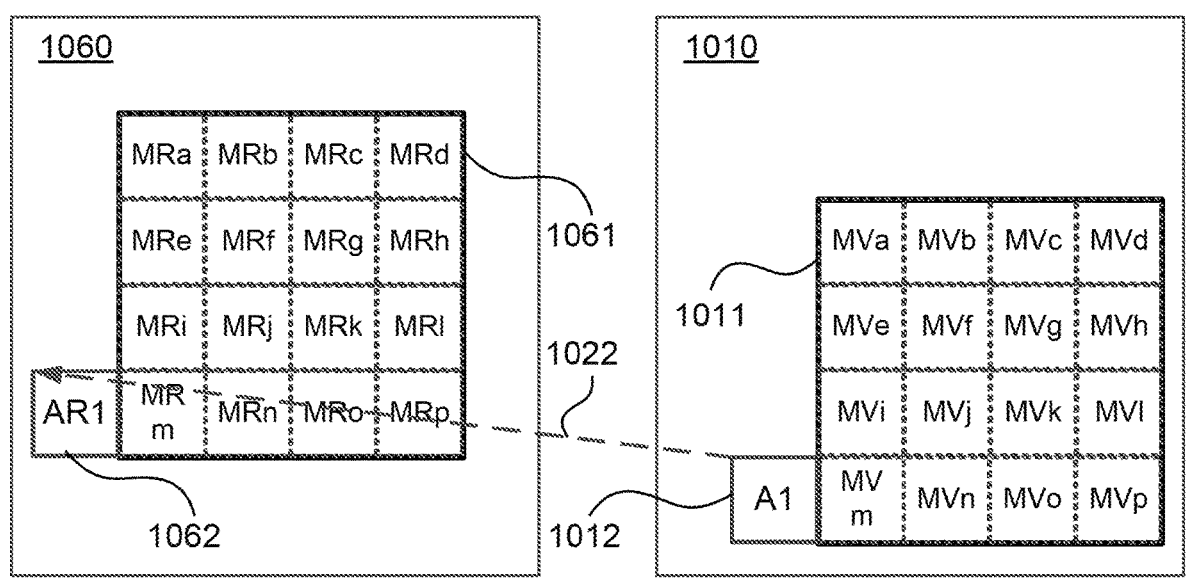
FIG. 10B is a schematic illustration of a selected spatial neighboring block for a sub-block based temporal motion vector prediction method in accordance with one embodiment.

FIG. 10B is a schematic illustration of determining motion information for sub-blocks of the current block (1011) using the SbTMVP method based on a selected spatial neighboring block, such as block A1 in this non-limiting example, in accordance with an embodiment. In this example, the current block (1011) is in a current picture (1010), and a reference block (1061) is in a reference picture (1060) and can be identified based on a motion shift (or displacement) between the current block (1011) and the reference block (1061) indicated by a motion vector (1022).

In some embodiments, similar to a temporal motion vector prediction (TMVP) in HEVC, a SbTMVP uses the motion information in various reference sub-blocks in a reference picture for a current block in a current picture. In some embodiments, the same reference picture used by TMVP can be used for SbTVMP. In some embodiments, TMVP predicts motion information at a CU level but SbTMVP predicts motion at a sub-CU level. In some embodiments, TMVP uses the temporal motion vectors from collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 10A, neighboring blocks A1, B1, B0, and A0 can be sequentially checked in a SbTVMP process. As soon as a first spatial neighboring block that has a motion vector that uses the reference picture (1060) as its reference picture is identified, such as block A1 having the motion vector (1022) that points to a reference block AR1 in the reference picture (1060) for example, this motion vector (1022) can be used for performing the motion shift. If no such motion vector is available from the spatial neighboring blocks A1, B1, B0, and A0, the motion shift is set to (0, 0).

After determining the motion shift, the reference block (1061) can be identified based on a position of the current block (1011) and the determined motion shift. In FIG. 10B, the reference block (1061) can be further divided into 16 sub-blocks with reference motion information MRa through MRp. In some examples, the reference motion information for each sub-block in the reference block (1061) can be determined based on a smallest motion grid that covers a center sample of such sub-block. The motion information can include motion vectors and corresponding reference indices. The current block (1011) can be further divided into 16 sub-blocks, and the motion information MVa through MVp for the sub-blocks in the current block (1011) can be derived from the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In an example, a combined sub-block based merge list which contains a SbTVMP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added as the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

4. History-Based Motion Vector Prediction (HMVP) Mode

Figure 11A:
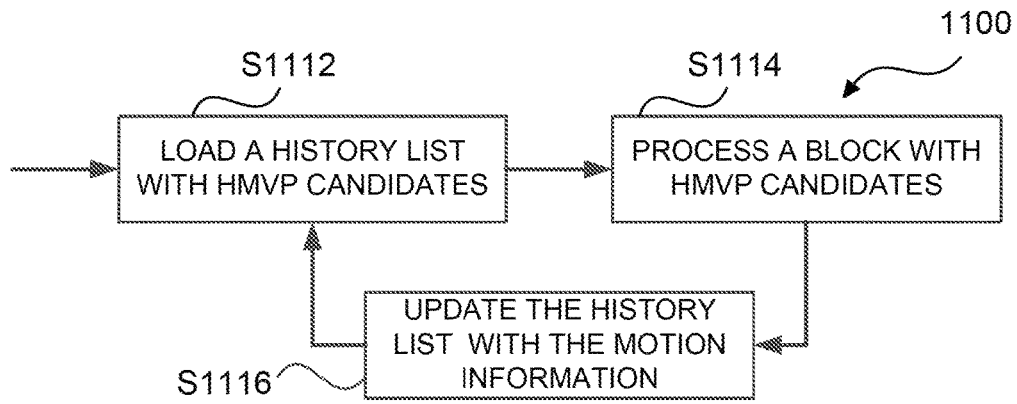
FIG. 11A is a flow chart outlining a process of constructing and updating a list of motion information candidates using a history based motion vector prediction method in accordance with one embodiment.

FIG. 11A is a flow chart outlining a process (1100) of constructing and updating a list of motion information candidates using a history based MV prediction (HMVP) method in accordance with one embodiment.

In some embodiments, a list of motion information candidates using the HMVP method can be constructed and updated during an encoding or decoding process. The list can be referred to as a history list. The history list can be stored in forms of an HMVP table or an HMVP buffer. The history list can be emptied when a new slice begins. In some embodiments, whenever there is an inter-coded non-affine block that is just encoded or decoded, the associated motion information can be added to a last entry of the history list as a new HMVP candidate. Therefore, before processing (encoding or decoding) a current block, the history list with HMVP candidates can be loaded (S1112). The current block can be encoded or decoded using the HMVP candidates in the history list (S1114). Afterwards, the history list can be updated using the motion information for encoding or decoding the current block (S1116).

Figure 11B:
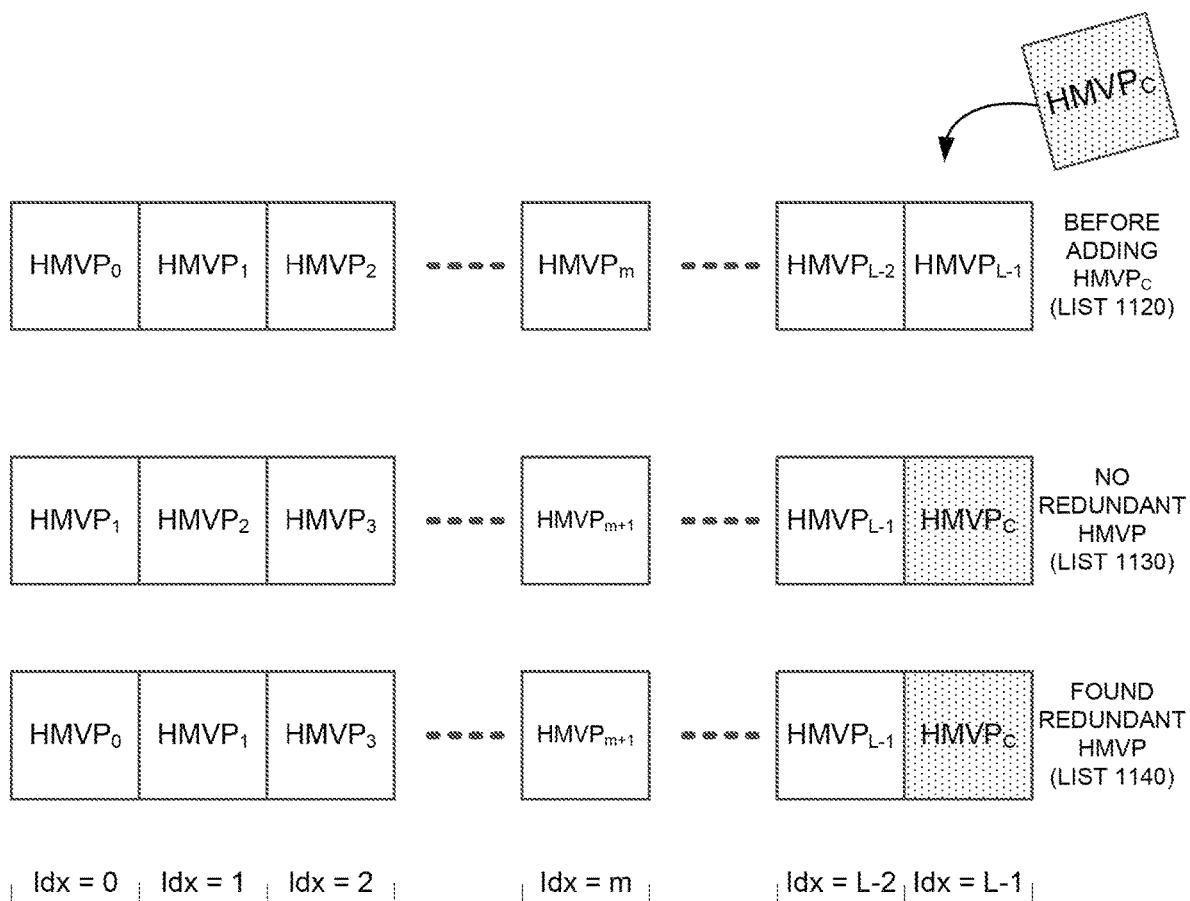
FIG. 11B is a schematic illustration of updating the list of motion information candidates using the history based motion vector prediction method in accordance with one embodiment.

FIG. 11B is a schematic illustration of updating the list of motion information candidates using the history based MV prediction method in accordance with one embodiment. FIG. 11B shows a history list having a size of L, where each candidate in the list can be identified with an index ranging from 0 to L−1. L is an integer equal to or greater than 0. Before encoding or decoding a current block, the history list (1120) includes L candidates $HMVP_0$, $HMVP_1$, $HMVP_2$, ... $HMVP_m$, ..., $HMVP_{L-2}$, and $HMVP_{L-1}$, where m is an integer ranging from 0 to L. After encoding or decoding a current block, a new entry $HMVP_C$ is to be added to the history list.

In an example, the size of the history list can be set to 6, which indicates up to 6 HMVP candidates can be added to the history list. When inserting a new motion candidate (e.g., $HMVP_C$) to the history list, a constrained first-in-first-out (FIFO) rule can be utilized, wherein a redundancy check is first applied to find whether there is a redundant HMVP in the history list. When no redundant HMVP is found, the first HMVP candidate ($HMVP_1$ in FIG. 11B example, with index=0) is removed from the list, and all other HMVP candidates afterwards are moved forward, e.g., with indices reduced by 1. The new $HMVP_C$ candidate can be added to the last entry of the list (with index=L−1 in FIG. 11B for example), as shown in the resulting list (1130). On the other hand, if a redundant HMVP is found (such as $HMVP_2$ in FIG. 11B example), the redundant HMVP in the history list is removed from the list, and all the HMVP candidates afterwards are moved forward, e.g., with indices reduced by 1. The new $HMVP_C$ candidate can be added to the last entry of the list (with index=L−1 in FIG. 11B for example), as shown in the resulting list (1140).

In some examples, the HMVP candidates could be used in the merge candidate list construction process. For example, the latest HMVP candidates in the list can be checked in order and inserted into the candidate list after a TMVP candidate. Pruning can be applied on the HMVP candidates against the spatial or temporal merge candidates, but not the sub-block motion candidates (i.e., SbTMVP candidates) in some embodiments.

In some embodiments, to reduce the number of pruning operations, one or more of the following rules can be followed:
  (a) Number of HMPV candidates to be checked denoted by M is set as follows:
    $M=(N<=4)?L:(8-N)$,
    wherein N indicates a number of available non-sub block merge candidates, and L indicates number of available HMVP candidates in the history list.
  (b) In addition, once the total number of available merge candidates becomes only one less than a signaled maximum number of merge candidates, the merge candidate list construction process from HMVP list can be terminated.
  (c) Moreover, the number of pairs for combined bi-predictive merge candidate derivation can be reduced from 12 to 6.

In some embodiments, HMVP candidates can be used in an AMVP candidate list construction process. The motion vectors of the last K HMVP candidates in the history list can be added to an AMVP candidate list after a TMVP candidate. In some examples, only HMVP candidates with the same reference picture as an AMVP target reference picture are to be added to the AMVP candidate list. Pruning can be applied on the HMVP candidates. In some examples, K is set to 4 while the AMVP list size is kept unchanged, e.g., equal to 2.

5. Pairwise Average Motion Vector Candidates

In some embodiments, pairwise average candidates can be generated by averaging predefined pairs of candidates in a current merge candidate list. For example, the predefined pairs are defined as {(0, 1), (0, 2), (1, 2), (0, 3), (1, 3), (2, 3)} in an embodiment, where the numbers denote the merge indices to the merge candidate list. For example, the averaged motion vectors are calculated separately for each reference picture list. If both to-be-averaged motion vectors are available in one list, these two motion vectors are averaged even when they point to different reference pictures. If only one motion vector is available, the available one can be used directly. If no motion vector is available, the respective pair is skipped in one example. The pairwise average candidates replace the combined candidates in some embodiments in constructing a merge candidate list.

6. Merge with Motion Vector Difference (MMVD) Mode

In some embodiments, a merge with motion vector difference (MMVD) mode is used for determining a motion vector predictor of a current block. The MMVD mode can be used when skip mode or merge mode is enabled. The MMVD mode reuses merge candidates on a merge candidate list of the skip mode or merge mode. For example, a merge candidate selected from the merge candidate list can be used to provide a starting point at a reference picture. A motion vector of the current block can be expressed with the starting point and a motion offset including a motion magnitude and a motion direction with respect to the starting point. At an encoder side, selection of the merge candidate and determination of the motion offset can be based on a search process (an evaluation process). At a decoder side, the selected merge candidate and the motion offset can be determined based on signaling from the encoder side.

The MMVD mode can reuse a merge candidate list constructed in various inter prediction modes described herein. In some examples, only candidates of a default merge type (e.g., MRG_TYPE_DEFAULT_N) on the merge candidate list are considered for MMVD mode. Examples of the merge candidates of the default merge types can include (i) merge candidates employed in the merge mode, (ii) merge candidates from a history buffer in the HMVP mode, and (iii) pairwise average motion vector candidates as described herein. Merge candidates in the affine mode or SbTMVP mode are not used for expansion in MMVD mode in some examples.

A base candidate index (IDX) can be used to define the starting point. For example, a list of merge candidates (motion vector predictors (MVPs)) associated with indices from 0 to 3 is shown in Table 1. The merge candidate having an index of the base candidate index can be determined from the list, and used to provide the starting point.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

A distance index can be used to provide motion magnitude information. For example, a plurality of predefined pixel distances are shown in Table 2 each associated with indices from 0 to 7. The pixel distance having an index of the distance index can be determined from the plurality of pixel distances, and used to provide the motion magnitude.

TABLE 2

| Distance IDX | | | | | | | | |
|---|---|---|---|---|---|---|---|---|
| Distance IDX | | | | | | | | |
| | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

A direction index can be used to provide motion direction information. For example, four directions with indices from 00 to 11 (binary) are shown in Table 3. The direction with an index of the direction index can be determined from the four directions, and used to provide a direction of the motion offset with respect to the starting point.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

MMVD syntax elements can be transmitted in a bitstream to signal a set of MMVD indices including a base candidate index, a direction index, and a distance IDX in the MMVD mode.

In some embodiments, an MMVD enable flag is signaled after sending a skip and merge flag for coding a current block. For example, when the skip and merge flag is true, the MMVD flag is parsed. When the MMVD flag is equal to 1, in an example, the MMVD syntax elements (the set of MMVD indices) are parsed. In one example, when the MMVD flag is not 1, a flag associated with another mode, such as an AFFINE flag, is parsed. When the AFFINE flag is equal to 1, the AFFINE mode is used for processing the current block. When the AFFINE flag is not 1, in an example, a skip/merge index is parsed for processing the current block with skip/merge mode.

Figure 12:
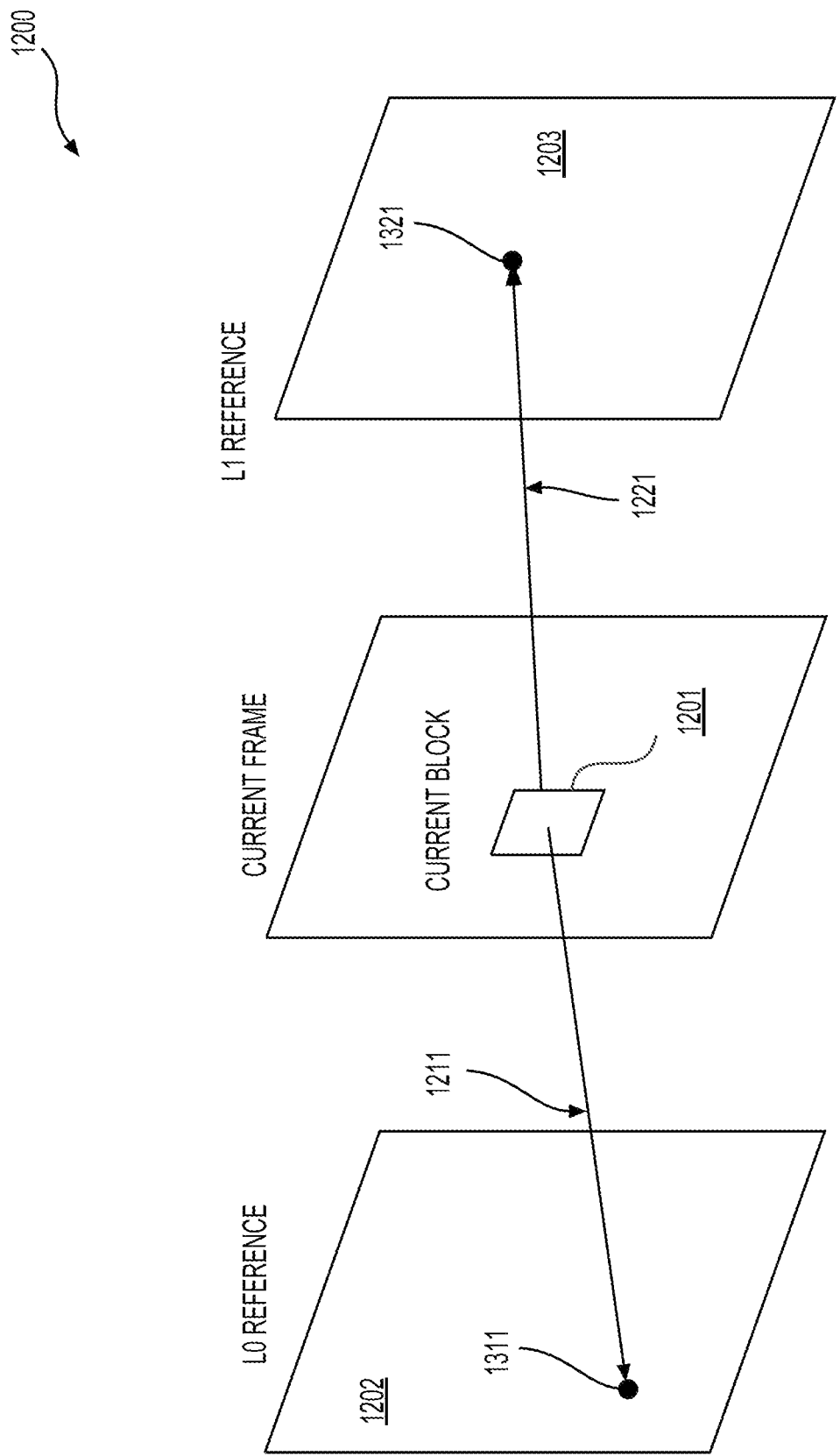
FIG. 12 is a schematic illustration of determining starting points at two reference pictures associated with two reference picture lists based on motion vectors of a merge candidate in a merge with motion vector difference (MMVD) mode in accordance with an embodiment.
Figure 13:
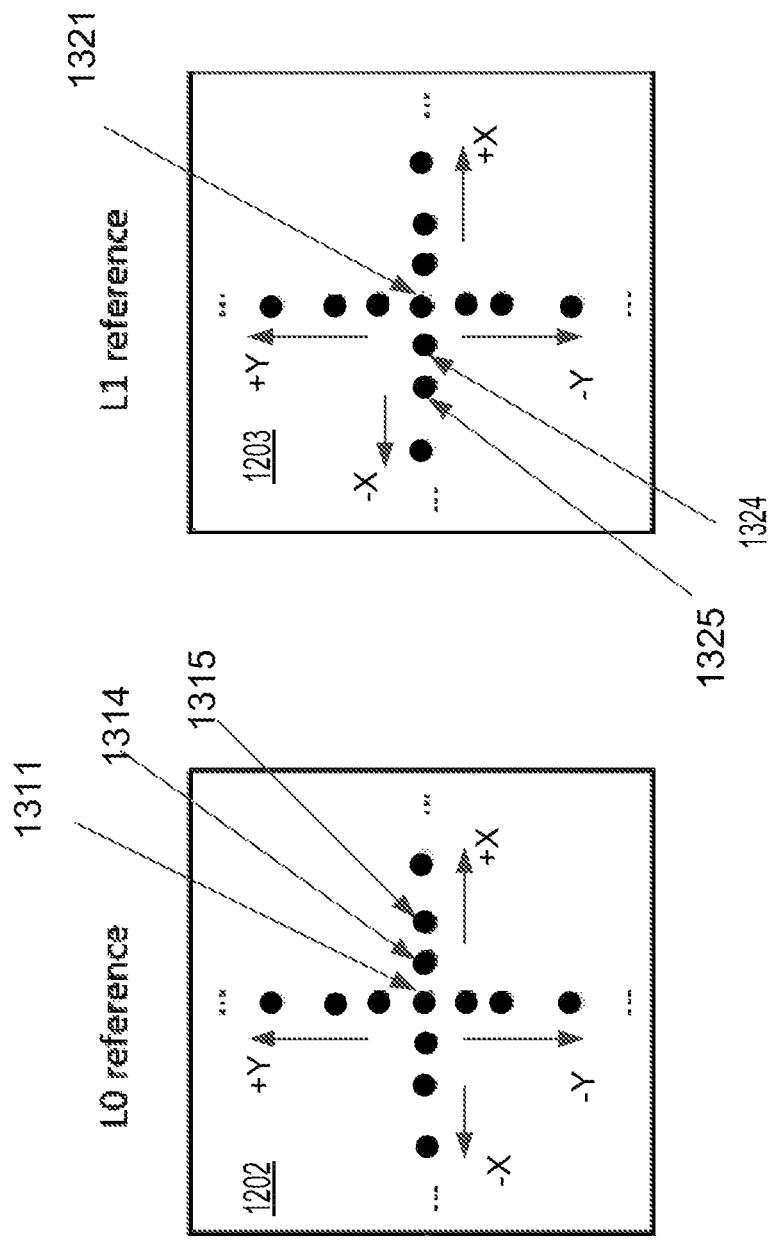
FIG. 13 is a schematic illustration of predetermined points surrounding two starting points that are to be evaluated in the MMVD mode in accordance with an embodiment.

FIGS. 12-13 show an example of a search process in MMVD mode according to an embodiment of the disclosure. By performing the search process, a set of MMVD indices including a base candidate index, a direction index, and a distance index can be determined for a current block (1201) in a current picture (or referred to as a current frame).

As shown in FIGS. 12-13, a first motion vector (1211) and a second motion vector (1221) belonging to a first merge candidate are shown. The first merge candidate can be a merge candidate on a merge candidate list constructed for the current block (1201). The first and second motion vectors (1211) and (1221) can be associated with two reference pictures (1202) and (1203) in reference picture lists L0 and L1, respectively. Accordingly, two starting points (1311) and (1321) in FIG. 13 can be determined at the reference pictures (1202) and (1203).

In an example, based on the starting points (1311) and (1321), multiple predefined points extending from the starting points (1311) and (1321) in vertical directions (represented by +Y, or −Y) or horizontal directions (represented by +X and −X) in the reference pictures (1202) and (1203) can be evaluated. In one example, a pair of points mirroring each other with respect to the respective starting point (1311) or (1321), such as the pair of points (1314) and (1324), or the pair of points (1315) and (1325), can be used to determine a pair of motion vectors which may form a motion vector predictor candidate for the current block (1201). Those motion vector predictor candidates determined based on the predefined points surrounding the starting points (1311) or (1321) can be evaluated.

In addition to the first merge candidate, other available or valid merge candidates on the merge candidate list of the current block (1201) can also be evaluated similarly. In one example, for a uni-predicted merge candidate, only one prediction direction associated with one of the two reference picture lists is evaluated.

Based on the evaluations, a best motion vector predictor candidate can be determined. Accordingly, corresponding to the best motion vector predictor candidate, a best merge candidate can be selected from the merge list, and a motion direction and a motion distance can also be determined. For example, based on the selected merge candidate and the Table 1, a base candidate index can be determined. Based on the selected motion vector predictor, such as that corresponding to the predefined point (1315) (or (1325)), a direction and a distance of the point (1315) with respect to the starting point (1311) can be determined. According to Table 2 and Table 3, a direction index and a distance index can accordingly be determined.

It is noted that the examples described above are merely for illustrative purpose. In alternative examples, based on the motion vector expression method provided in the MMVD mode, the motion distances and motion directions may be defined differently. In addition, the evaluation process (search process) may be performed differently. For example, for a bi-prediction merge candidate, three types of prediction directions (e.g., L0, L1, and L0 and L1) may be evaluated based on a set of predefined distances and directions to select a best motion vector predictor. For another example, a uni-predicted merge candidate may be converted by mirroring or scaling to a bi-predicted merge candidate, and subsequently evaluated. In the above examples, an additional syntax indicating a prediction direction (e.g., L0, L1, or L0 and L1) resulting from the evaluation process may be signaled.

As described above, merge candidates on a merge candidate list are evaluated to determine a base candidate in the MMVD mode at an encoder. At a decoder, using a base candidate index as input, a motion vector predictor can be selected from a merge candidate list. Accordingly, no additional line buffer is needed for the MMVD mode in addition to a line buffer for storage of the merge candidates.

III. Merge Sharing Region with a Shared Merge List

In some embodiments, a merge sharing region with a shared merge list is employed when a size of a current block and/or sizes of sub-blocks within the current block meet certain conditions. For example, leaf CUs of an ancestor node in a CU split tree can share a merge candidate list. In this way, separately construction of a merge candidate list for each of the leaf CUs can be avoided, which enables parallel processing of small merge/skip-coded CUs within a merge sharing region. The ancestor node is named a merge sharing node or a merge sharing region. The shared merge candidate list is generated for the merge sharing node pretending the merge sharing node is a leaf CU.

Whether a split-tree node can be treated as a merge sharing node can be decided for each node inside a CTU during a parsing stage of decoding. In an example, an ancestor node of leaf CUs can be determined to be a merge sharing node when the ancestor node satisfies the following criteria:

(a) The block size of the ancestor node is equal to or larger than a size threshold (e.g., 32 pixels, 64 pixels, or the like);
(b) Within the ancestor node, one of the child CU has a size smaller than the size threshold.

FIG. 14A shows examples of merge sharing regions (1401)-(1404) defined based on a size threshold of 64 pixels. Each of the merge sharing regions (1401)-(1404) has a block size of 64 pixels equal to the size threshold. Each of the merge sharing regions (1401)-(1404) includes at least one leaf CU having a size smaller than the size threshold.

FIG. 14B shows another example of a merge sharing region (1410) defined based on a size threshold of 64 pixels. The merge sharing region (1410) includes three sub-blocks (1411)-(1413) having sizes of 32, 64, and 32 pixels, respectively. The merge sharing region (1410) has a size of 128 pixels that is larger than the size threshold, and includes two sub-blocks (1411) and (1413) that have a size smaller than the size threshold.

In other examples, determination of a merge sharing region can be based on a different definition. For example, an ancestor node of leaf CUs having a block size smaller than a threshold can be determined to be a merge sharing region. Using FIG. 14B as an example, when a threshold of 64 pixels is used, either of the blocks 1411-1413 can be determined to be a merge sharing region.

In addition, in some examples, no samples of the merge sharing node are outside the picture boundary. During a parsing stage, if an ancestor node satisfies a definition of a merge sharing region, but has some samples outside a picture boundary, this ancestor node will not be treated as a merge sharing node. Child CUs within this node may next be evaluated to determine a merge sharing region.

The shared merge candidate list algorithm can support translational merge/skip modes, such as regular merge mode, CRP mode (or IBC mode), triangle partition mode, sbTMVP mode, MMVD mode, and the like. In some examples, affine merge mode is excluded for encoding blocks in a merge sharing region. Those merge/skip modes can be combined with an HMVP table when being used within a merge sharing region. For those merge/skip modes, the behavior of shared merge candidate list algorithm is similar to that based on a regular merge candidate list. The shared merge candidate list algorithm just generates candidates for a merge sharing node pretending the merge sharing node is a leaf CU.

It is noted that leaf CUs within a merge sharing region may be coded using coding modes other than a merge/skip mode. For example, a CU within a merge sharing node may be coded with an intra mode, or an inter mode other than the merge/skip mode (e.g., AMVP mode).

IV. HMVP Table Updating for CUs within a Merge Sharing Region

In some examples, the merge sharing region scheme is employed to enable parallel processing of sub-blocks within a merge sharing region. In addition, the merge sharing region scheme can be combined with the HMVP scheme to improve inter picture coding performance. For example, when a merge sharing region is identified at a parsing stage at a decoder, a shared merge list can be constructed for the merge sharing region. The construction of the merge sharing region can include HMVP candidates from an HMVP table.

Sub-blocks (or coding blocks) within the merge sharing region can be coded with an intra prediction mode (intra mode), or an inter prediction mode (inter mode). For each inter coded sub-block, corresponding motion information can be used to update the HMVP table.

However, according to an aspect of the disclosure, performing HMVP table updating for each inter coded sub-block (or coding block) within the merge sharing region may be unnecessary. For example, the sub-blocks within the merge sharing region are close to each other. There is a high probability that the neighboring inter coded blocks have similar motion information. In addition, those sub-blocks within the merge sharing region share the same merge list. There is a high probability that different inter coded sub-blocks would use a same merge candidate as their motion information as a result of a merge mode decoding process. Thus, HAVP table updating based on that similar motion information would be redundant. In contrast, performing HMVP table updating for a subset of those inter-coded blocks may be more suitable and can save computational cost associated with HMVP table updating.

Accordingly, in some embodiments, restrictions are applied to the HMVP table updating process when the merge sharing region method and the HMVP method are combined. For example, instead of performing an HMVP table updating whenever an inter coded sub-block is decoded, only a subset of the inter coded sub-blocks within a merge sharing region will incur an HMVP table updating operation. In this way, cost of HMVP table updating can be avoided or reduced, and coding quality can be maintained.

In an embodiment, no HMVP table updating is performed for inter coded sub-blocks within a merge sharing region.

In some embodiments, whether an inter coded sub-block within a merge sharing region incurs HMVP table updating depends on what type of inter prediction mode is used for encoding/decoding the corresponding sub-block.

Figure 15:
FIG. 15 shows a table of inter prediction modes that can be used for encoding or decoding sub-blocks within a merge sharing region in accordance with some embodiments.

FIG. 15 shows a table (1500) of inter prediction modes (inter modes) that can be used within a merge sharing region. Motion information can be generated when one of those inter modes is used for encoding/decoding a sub-block within a merge sharing region. The motion information might be used for updating an HMVP table. The inter modes in the table (1500) can be separated into two categories: merge/skip mode and AMVP mode.

In AMVP mode, an AMVP candidate list can be constructed for encoding a sub-block. The AMVP candidate list can include a set of AMVP candidates selected from neighboring blocks of the sub-block. An HMVP table may be employed for constructing the AMVP mode in an example. Motion estimation can be performed to determine motion information for the sub-block. A difference between a selected AMVP candidate and the motion information resulting from the motion estimation can be signaled from an encoder to a decoder together with an index to the selected AMVP candidate on the AMVP candidate list. When decoding the sub-block at the decoder, the original motion information is recovered based on the signaled difference and the index. In some examples, the AMVP candidate list is separately constructed from a shared merge list corresponding to the sub-block. In some examples, the AMVP candidate list can be a subset of the corresponding shared merge list. In some examples, the corresponding shared merge list can be used as the AMVP candidate list.

The merge/skip mode in the table (1500) can include two groups of coding modes: Group I and Group II. Group I includes inter modes that use a merge candidate on a shared merge list as motion information for encoding or decoding a sub-block (leaf CU) within a merge sharing region. Examples of inter modes in Group I can include regular merge mode, CRP mode, and the like. When a Group I inter mode is used for encoding a sub-block within a merge sharing region, a candidate on a shared merge list can be selected to provide motion information for determine a prediction for the sub-block. Subsequently, a difference (residue) between the prediction and the sub-block can be coded and transmitted. When skip mode is employed, no residue signal is generated or transmitted.

Group II includes inter modes that use motion information determined based on a merge candidate on a share merge list for encoding or decoding a sub-block within a merge sharing region. Examples of inter modes in Group II can include triangle partition mode, sbTMVP mode, MMVD mode, and the like. When a Group II inter mode is used for encoding a sub-block within a merge sharing region with a shared merge list, motion information can be constructed based on merge candidates on the shared merge list (e.g., triangle partition mode). Or, a merge candidate on the shared merge list can be used to determine a target block and motion information of sub-blocks within the target block can be obtained for encoding the sub-block within the merge sharing region (e.g., sbTMVP mode). Or, a merge candidate on the shared merge list can be used to provide an initial point on a reference picture to facilitate a search for motion information over positions neighboring the initial point (e.g., MMVD). In the above cases, the resulting motion information can be different from the merge candidates on the shared merge list.

Based on the categorization of the table (1500), in an embodiment, when a sub-block within a merge sharing region is inter coded with a merge/skip mode, no HMVP table updating is performed after the sub-block is decoded. In contrast, when a sub-block within a merge sharing region is inter coded with a coding mode other than a merge/skip mode, such as an AMVP mode, motion information resulting from decoding the sub-block is used to update an HMVP table.

As described, a merge/skip mode, when used for encoding or decoding a sub-block within a merge sharing region, is based on a shared merge list. The shared merge list may include motion information that is already included in an HMVP table recently. Motion information resulting from the merge/skip mode can be the same as or similar to a merge candidate on the shared merge list, and thus may have a high probability of being already included in the HMVP table. Accordingly, updating the HMVP table with that information may be inefficient.

In contrast, in an AMVP mode, a motion difference is determined and encoded. Accordingly, motion information resulting from the AMVP mode can be different from an AMVP candidate on an AMVP candidate list (which may be similar to or different from a share merge list). Thus, the motion information has a low probability of being already included in the HMVP table. Updating the HMVP table with the motion information can be beneficial.

In another embodiment, when a sub-block within a merge sharing region is inter coded with a Group I mode (e.g., regular merge mode, or CRP mode), no HMVP table updating is performed with motion information of the sub-block. In contrast, when a sub-block within a merge sharing region is inter coded with an inter mode other than a Group I mode, such as a Group II mode, or an AMVP mode, motion information resulting from decoding the sub-block is used to update an HMVP table.

As described, a Group II inter mode, when used for encoding or decoding a sub-block within a merge sharing region, determines motion information of the sub-block based on a merge candidate on a share merge list, but the determined motion information can be different from the merge candidate on the share merge list, and have a certain probability of not being included in an HVMP table. Thus, updating an HMVP table with motion information resulting from a Group II mode may achieve some coding gain in certain scenarios.

In some embodiments, one sub-block is selected from a set of inter coded sub-blocks within a merge sharing region for updating an HMVP table. For example, there are a plurality of inter coded sub-blocks, for example, coded with the inter prediction modes in the table (1500) according to an encoding/decoding order (e.g., a raster scan order, a zig-zag order, or the like). The first or a last sub-block according to the coding order can be selected to update the HMVP table. For the other inter coded sub-blocks, no HMVP table updating is performed. In this way, an HMVP table updating cost can be reduced.

In various embodiments, for inter coded blocks not included a merge sharing region, HMVP table updating can be performed with corresponding motion information of those inter coded blocks.

Figure 16:
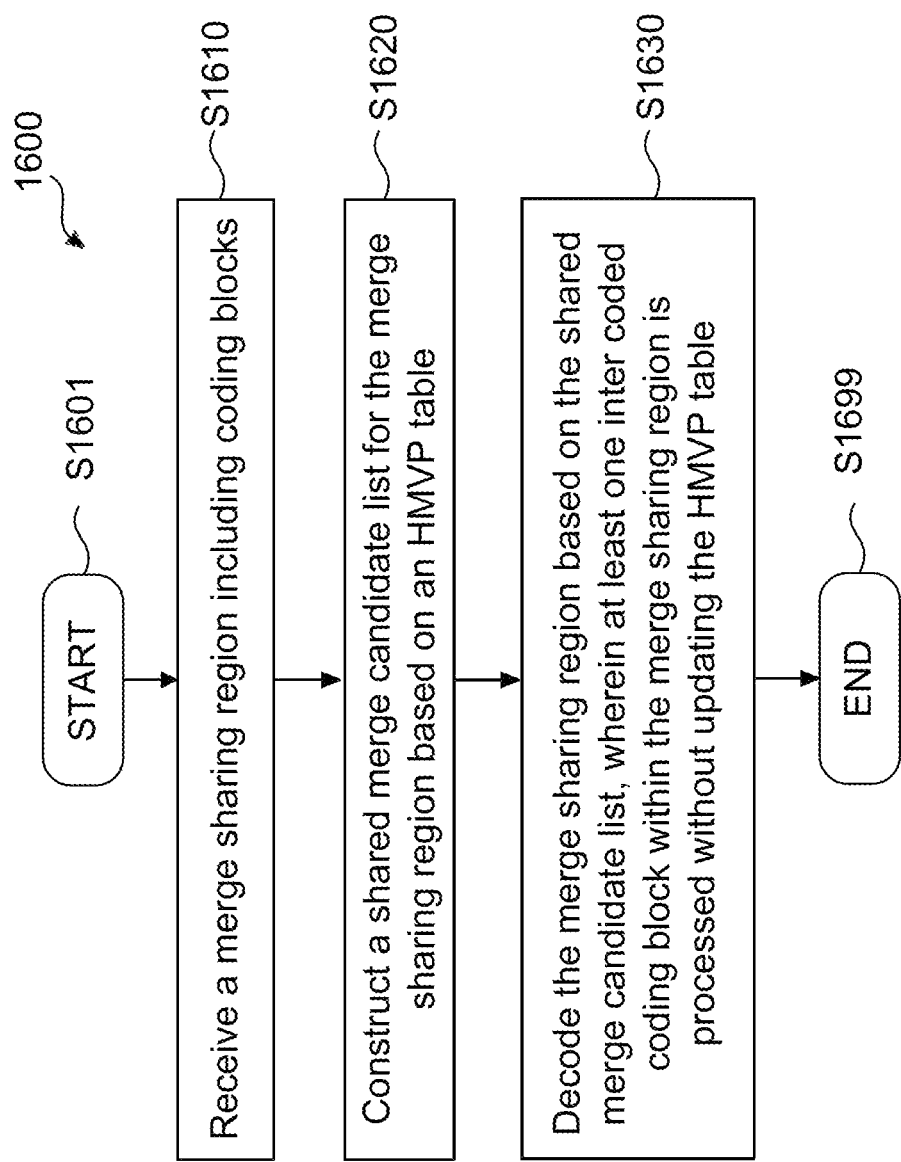
FIG. 16 is a flow chart outlining a video decoding process for decoding a merge sharing region in accordance with an embodiment.

FIG. 16 shows a flow chart outlining a process (1600) according to an embodiment of the disclosure. The process (1600) can be used for decoding a merge sharing region based on an HMVP table. In various embodiments, the process (1600) are executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (1600) is implemented in software instructions, thus when the processing circuitry executes the software instructions, the processing circuitry performs the process (1600). The process starts at (S1601) and proceeds to (S1610).

At (S1610), a merge sharing region including a plurality of coding blocks is received. For example, a decoder can receives a bitstream of coding blocks partitioned from a picture. At a parsing stage, the merge sharing region can be determined based on a size threshold.

At (S1620), a shared merge candidate list can be constructed for decoding the merge sharing region. HMVP candidates from an HMVP table can be added to the shared merge candidate list. The share merge candidate list can include other types of merge candidates such as spatial merge candidates, temporal merge candidates, pair-wise average bi-prediction candidates, or the like.

At (S1630), the merge sharing region can be decoded based on the share merge candidate list. For example, the coding blocks within the merge sharing region can be inter coded or intra coded. For the inter coded blocks, motion information can be determined during the decoding process. However, in order to reduce HMVP table updating cost, not all the inter coded blocks will incur an HMVP updating operation.

In an example, no HMVP updating operation is performed for coding blocks within the merge sharing region. In an example, whether to update the HMVP table with motion information of a coding block in the merge sharing region can depends on the type of the inter prediction mode used for coding the respective coding block. In an example, one coding block (e.g., a first or last one according to a coding order) can be selected from the inter coded blocks within the merge sharing region, motion information of which can be used to update the HMVP table. The process (1600) can proceed to (S1699), and terminate at (S1699).

The techniques described above, can be implemented as computer software using computer-readable instructions and physically stored in one or more computer-readable media. For example, FIG. 17 shows a computer system (1700) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 17:
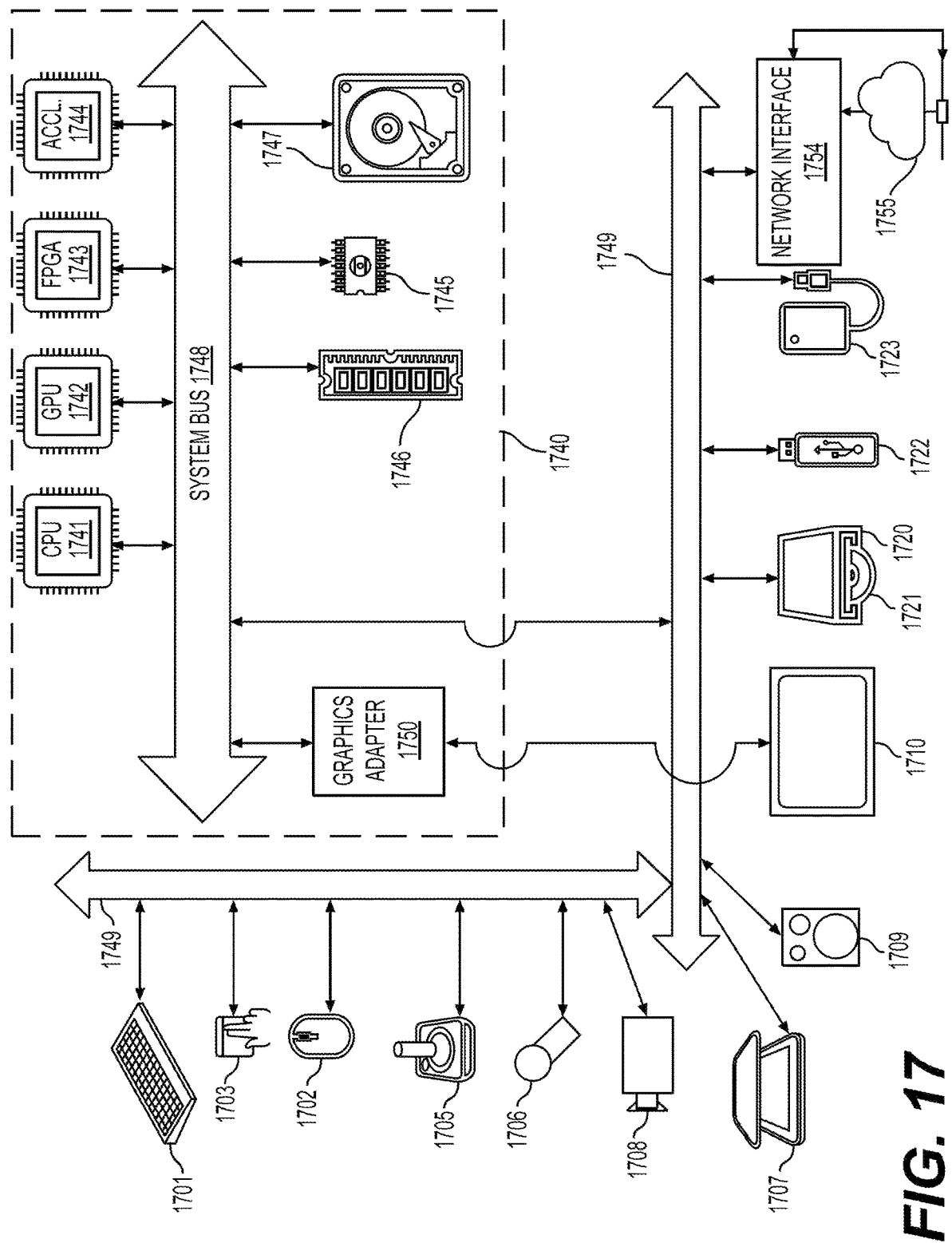
FIG. 17 is a schematic illustration of a computer system in accordance with an embodiment.

The components shown in FIG. 17 for computer system (1700) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1700).

Computer system (1700) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1701), mouse (1702), trackpad (1703), touch screen (1710), data-glove (not shown), joystick (1705), microphone (1706), scanner (1707), camera (1708).

Computer system (1700) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1710), data-glove (not shown), or joystick (1705), but there can also be tactile feedback devices that do not serve as input devices), audio output devices (such as: speakers (1709), headphones (not depicted)), visual output devices (such as screens (1710) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1700) can also include human accessible storage devices and their associated media such as optical media including CD/DVD ROM/RW (1720) with CD/DVD or the like media (1721), thumb-drive (1722), removable hard drive or solid state drive (1723), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1700) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1749) (such as, for example USB ports of the computer system (1700)); others are commonly integrated into the core of the computer system (1700) by attachment to a system bus as described below (for example Ethernet interface into a PC computer system or cellular network interface into a smartphone computer system). Using any of these networks, computer system (1700) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1740) of the computer system (1700).

The core (1740) can include one or more Central Processing Units (CPU) (1741), Graphics Processing Units (GPU) (1742), specialized programmable processing units in the form of Field Programmable Gate Areas (FPGA) (1743), hardware accelerators for certain tasks (1744), and so forth. These devices, along with Read-only memory (ROM) (1745), Random-access memory (1746), internal mass storage such as internal non-user accessible hard drives, SSDs, and the like (1747), may be connected through a system bus (1748). In some computer systems, the system bus (1748) can be accessible in the form of one or more physical plugs to enable extensions by additional CPUs, GPU, and the like. The peripheral devices can be attached either directly to the core's system bus (1748), or through a peripheral bus (1749). Architectures for a peripheral bus include PCI, USB, and the like.

CPUs (1741), GPUs (1742), FPGAs (1743), and accelerators (1744) can execute certain instructions that, in combination, can make up the aforementioned computer code. That computer code can be stored in ROM (1745) or RAM (1746). Transitional data can be also be stored in RAM (1746), whereas permanent data can be stored for example, in the internal mass storage (1747). Fast storage and retrieve to any of the memory devices can be enabled through the use of cache memory, that can be closely associated with one or more CPU (1741), GPU (1742), mass storage (1747), ROM (1745), RAM (1746), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1700), and specifically the core (1740) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1740) that are of non-transitory nature, such as core-internal mass storage (1747) or ROM (1745). The software implementing various embodiments of the present disclosure can be stored in such devices and executed by core (1740). A computer-readable medium can include one or more memory devices or chips, according to particular needs. The software can cause the core (1740) and specifically the processors therein (including CPU, GPU, FPGA, and the like) to execute particular processes or particular parts of particular processes described herein, including defining data structures stored in RAM (1746) and modifying such data structures according to the processes defined by the software. In addition or as an alternative, the computer system can provide functionality as a result of logic hardwired or otherwise embodied in a circuit (for example: accelerator (1744)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

ASIC: Application-Specific Integrated Circuit
BMS: benchmark set
CANBus: Controller Area Network Bus
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HRD: Hypothetical Reference Decoder
IC: Integrated Circuit
JEM: joint exploration model
LAN: Local Area Network
LCD: Liquid-Crystal Display
LTE: Long-Term Evolution
MV: Motion Vector
OLED: Organic Light-Emitting Diode PBs: Prediction Blocks
PCI: Peripheral Component Interconnect
PLD: Programmable Logic Device
PUs: Prediction Units
RAM: Random Access Memory
ROM: Read-Only Memory
SEI: Supplementary Enhancement Information
SNR: Signal Noise Ratio
SSD: solid-state drive
TUs: Transform Units,
USB: Universal Serial Bus
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video encoding, comprising:
receiving, by processing circuitry of a video encoder, a merge sharing region including a plurality of coding blocks;
constructing a shared merge candidate list for the merge sharing region;
encoding a current inter coded coding block based on the shared merge candidate list;
determining whether to update a history-based motion vector prediction (HMVP) table with motion information of the current inter coded coding block based on at least one of (i) a coding mode of the current inter coded coding block or (ii) a location of the current inter coded coding block; and
updating the HMVP table with the motion information of the current inter coded coding block when the HMVP table is determined to be updated with the motion information of the current inter coded coding block,
wherein at least one inter coded coding block within the merge sharing region is processed without updating the HMVP table with the motion information of the at least one inter coded coding block.

2. The method of claim 1, wherein the determining comprises determining not to update the HMVP table with the motion information of the current inter coded coding block based on the location of the current inter coded coding block being within the merge sharing region.

3. The method of claim 1, further comprising determining not to update the HMVP table with the motion information of the current inter coded coding block based on the current inter coded coding block being inter coded with at least one of a regular merge mode, a current reference picture (CRP) mode, or an intra block copy (IBC) mode.

4. The method of claim 1, wherein the current inter coded coding block is coded with at least one of a triangle partition mode, a subblock-based temporal motion vector prediction (sbTMVP) mode, or a merge with motion vector difference (MMVD) mode.

5. The method of claim 4, further comprising determining to update the HMVP table with the motion information of the current inter coded coding block based on the current inter coded coding block being inter coded with the at least one of the triangle partition mode, the sbTMVP mode, or the MMVD mode.

6. The method of claim 1, further comprising, in response to a determination that the current inter coded coding block is inter coded with a coding mode other than at least one of a regular merge mode, a current reference picture (CRP) mode, or an intra block copy (IBC) mode, determining to update the HMVP table with the motion information of the current inter coded coding block.

7. The method of claim 6, wherein the coding mode other than the at least one of the regular merge mode, the CRP mode, or the IBC mode is an advanced motion vector prediction (AMVP) coding mode.

8. The method of claim 1, further comprising, in response to a determination that the current inter coded coding block is located at a predetermined position in a coding order of coding blocks within the merge sharing region, determining to update the HMVP table with the motion information of the current inter coded coding block.

9. An apparatus of video encoding, comprising:
processing circuitry configured to
receive a merge sharing region including a plurality of coding blocks;
construct a shared merge candidate list for the merge sharing region;
encode a current inter coded coding block based on the shared merge candidate list;
determine whether to update a history-based motion vector prediction (HMVP) table with motion information of the current inter coded coding block based on at least one of (i) a coding mode of the current inter coded coding block or (ii) a location of the current inter coded coding block; and
update the HMVP table with the motion information of the current inter coded coding block when the HMVP table is determined to be updated with the motion information of the current inter coded coding block,
wherein at least one inter coded coding block within the merge sharing region is processed without updating the HMVP table with the motion information of the at least one inter coded coding block.

10. The method of claim 9, wherein the processing circuitry is further configured to determine not to update the HMVP table with the motion information of the current inter coded coding block based on the location of the current inter coded coding block being within the merge sharing region.

11. The apparatus of claim 9, wherein the processing circuitry is further configured to determine not to update the HMVP table with the motion information of the current inter coded coding block based on the current inter coded coding block being inter coded with at least one of a regular merge mode, a current reference picture (CRP) mode, or an intra block copy (IBC) mode.

12. The apparatus of claim 9, wherein the current inter coded coding block is coded with at least one of a triangle partition mode, a subblock-based temporal motion vector prediction (sbTMVP) mode, or a merge with motion vector difference (MMVD) mode.

13. The apparatus of claim 12, wherein the processing circuitry is further configured to update the HMVP table with the motion information of the current inter coded coding block based on the current inter coded coding block being inter coded with the at least one of the triangle partition mode, the sbTMVP mode, or the MMVD mode.

14. The apparatus of claim 9, wherein the processing circuitry is further configured to, in response to a determination that the current inter coded coding block is inter coded with a coding mode other than at least one of a regular merge mode, a current reference picture (CRP) mode, or an intra block copy (IBC) mode, determine to update the HMVP table with the motion information of the current inter coded coding block.

15. The apparatus of claim 14, wherein the coding mode other than the at least one of the regular merge mode, the CRP mode, or the IBC mode is an advanced motion vector prediction (AMVP) coding mode.

16. The apparatus of claim 15, wherein the processing circuitry is further configured to, in response to a determination that the current inter coded coding block is located at a predetermined position in a coding order of coding blocks within the merge sharing region, determine to update the HMVP table with the motion information of the current inter coded coding block.

17. A non-transitory computer-readable storage medium storing instructions executable by processing circuitry to perform a method of video encoding, the method comprising:

receiving a merge sharing region including a plurality of coding blocks;

constructing a shared merge candidate list for the merge sharing region;

encoding a current inter coded coding block based on the shared merge candidate list;

determining whether to update a history-based motion vector prediction (HMVP) table with motion information of the current inter coded coding block based on at least one of (i) a coding mode of the current inter coded coding block or (ii) a location of the current inter coded coding block; and updating the HMVP table with the motion information of the current inter coded coding block when the HMVP table is determined to be updated with the motion information of the current inter coded coding block, wherein at least one inter coded coding block within the merge sharing region is processed without updating the HMVP table with the motion information of the at least one inter coded coding block.

18. The non-transitory computer-readable storage medium of claim 17, wherein the determining comprises determining not to update the HMVP table with the motion information of the current inter coded coding block based on the location of the current inter coded coding block being within the merge sharing region.

19. The non-transitory computer-readable storage medium of claim 17, wherein the method further comprises determining not to update the HMVP table with the motion information of the current inter coded coding block based on the current inter coded coding block being inter coded with at least one of a regular merge mode, a current reference picture (CRP) mode, or an intra block copy (IBC) mode.

20. The non-transitory computer-readable storage medium of claim 17, wherein the current inter coded coding block is coded with at least one of a triangle partition mode, a subblock-based temporal motion vector prediction (sbTMVP) mode, or a merge with motion vector difference (MMVD) mode.

* * * * *